US008135651B2

(12) United States Patent
Kara

(10) Patent No.: US 8,135,651 B2
(45) Date of Patent: Mar. 13, 2012

(54) SYSTEM AND METHOD FOR PRINTING MULTIPLE POSTAGE INDICIA

(75) Inventor: Salim G. Kara, Ontario (CA)

(73) Assignee: Stamps.com Inc., Los Angeles, CA (US)

( * ) Notice: Subject to any disclaimer, the term of this patent is extended or adjusted under 35 U.S.C. 154(b) by 415 days.

(21) Appl. No.: 11/713,533

(22) Filed: Mar. 2, 2007

(65) Prior Publication Data

US 2007/0198441 A1 Aug. 23, 2007

Related U.S. Application Data

(63) Continuation of application No. 09/491,949, filed on Jan. 26, 2000, now Pat. No. 7,343,357, which is a continuation of application No. 08/965,015, filed on Nov. 5, 1997, now Pat. No. 6,208,980, which is a continuation-in-part of application No. 08/561,417, filed on Nov. 21, 1995, now Pat. No. 5,801,944, which is a continuation-in-part of application No. 08/540,658, filed on Oct. 11, 1995, now Pat. No. 5,717,597.

(51) Int. Cl.
*G06F 17/00* (2006.01)
(52) U.S. Cl. ........................................................ 705/408
(58) Field of Classification Search ........................ None
See application file for complete search history.

(56) References Cited

U.S. PATENT DOCUMENTS

| | | | | |
|---|---|---|---|---|
| 1,684,756 | A * | 9/1928 | Close | 462/67 |
| 1,988,908 | A | 1/1935 | MacKinnon | |
| 2,825,498 | A | 3/1958 | Alves | |
| 2,887,326 | A | 5/1959 | Kramer | |
| 2,964,232 | A | 12/1960 | Levyn | |
| 3,111,084 | A * | 11/1963 | Ridenour et al. | 101/47 |
| 3,380,648 | A | 4/1968 | De Lyra | |
| 3,658,239 | A | 4/1972 | Foutz | |
| 3,747,837 | A | 7/1973 | Wilson | |
| 3,938,095 | A * | 2/1976 | Check et al. | 705/402 |
| 3,978,457 | A | 8/1976 | Check, Jr. et al. | |
| 4,245,775 | A | 1/1981 | Conn | |
| 4,271,481 | A | 6/1981 | Check, Jr. et al. | |
| 4,306,299 | A | 12/1981 | Check, Jr. et al. | |
| 4,511,793 | A | 4/1985 | Racanelli | |
| 4,565,317 | A | 1/1986 | Kranz | |

(Continued)

FOREIGN PATENT DOCUMENTS

EP 0782111 7/1997

(Continued)

OTHER PUBLICATIONS

"The Meter is running", John Derrick, Office Systems, v11n9 Sep. 1994.*

(Continued)

*Primary Examiner* — Rutao Wu
(74) *Attorney, Agent, or Firm* — Fulbright & Jaworski L.L.P.

(57) ABSTRACT

A system and method for printing multiple postage indicia, such as an outbound and/or an associated return postage meter stamp, including a desired postage amount, onto a document or label is described. A processor based system is programmed to interact with a customer to produce the desired postage indicia and to print multiple ones of the indicia substantially contemporaneously. The indicia may include information to allow their use at a later date and/or from a location other than where they are produced.

26 Claims, 20 Drawing Sheets

U.S. PATENT DOCUMENTS 4,629,871 A 12/1986 Scribner et al.
4,641,347 A 2/1987 Clark et al.
4,649,266 A 3/1987 Eckert
4,661,001 A 4/1987 Takai et al.
4,709,850 A 12/1987 Wagner
4,725,718 A 2/1988 Sansone et al.
4,743,747 A 5/1988 Fougere et al.
4,757,537 A 7/1988 Edelmann et al.
4,760,532 A 7/1988 Sansone et al.
4,763,271 A 8/1988 Field
4,775,246 A 10/1988 Edelmann et al.
4,784,317 A 11/1988 Chen et al.
4,800,506 A 1/1989 Axelrod et al.
4,802,218 A 1/1989 Wright et al.
4,812,994 A 3/1989 Taylor et al.
4,821,195 A * 4/1989 Baer et al. .................... 705/404
4,831,554 A 5/1989 Storace et al.
4,831,555 A 5/1989 Sansone et al.
4,853,865 A 8/1989 Sansone et al.
4,862,386 A 8/1989 Axelrod et al.
4,864,618 A 9/1989 Wright et al.
4,868,757 A 9/1989 Gil
4,872,705 A * 10/1989 Hartfeil .......................... 283/67
4,875,174 A * 10/1989 Olodort et al. ............... 715/201
4,900,903 A 2/1990 Wright et al.
4,900,904 A 2/1990 Wright et al.
4,901,241 A 2/1990 Schneck
4,910,686 A 3/1990 Change et al.
4,919,325 A 4/1990 Culver
4,933,849 A 6/1990 Connell et al.
4,934,846 A 6/1990 Gilham
4,947,333 A 8/1990 Sansone et al.
4,993,752 A 2/1991 Juszak
4,998,204 A 3/1991 Sansone et al.
5,025,141 A 6/1991 Bolan
5,044,669 A * 9/1991 Berry ............................ 283/81
5,065,000 A 11/1991 Pusic
5,085,470 A 2/1992 Peach et al.
5,091,771 A 2/1992 Bolan et al.
5,111,030 A 5/1992 Brasington et al.
5,119,306 A 6/1992 Metelits et al.
5,136,647 A 8/1992 Haber et al.
5,200,903 A 4/1993 Gilham et al.
5,237,506 A 8/1993 Horbal et al.
5,239,168 A 8/1993 Dursty, Jr. et al.
5,316,208 A 5/1994 Petkovsek
5,319,562 A * 6/1994 Whitehouse ................. 705/403
5,341,505 A 8/1994 Whitehouse
5,375,172 A 12/1994 Chrosny
5,388,049 A 2/1995 Sansone et al.
5,410,642 A 4/1995 Hakamatsuka et al.
5,423,573 A 6/1995 Passillé
5,425,586 A 6/1995 Berson
5,437,441 A 8/1995 Tuhro et al.
5,439,721 A * 8/1995 Pedroli et al. ............... 428/42.1
5,454,038 A 9/1995 Cordery et al.
5,471,925 A 12/1995 Heinrich et al.
5,476,420 A 12/1995 Manning
5,490,077 A 2/1996 Freytag
5,494,445 A 2/1996 Sekiguchi et al.
5,501,393 A * 3/1996 Walz ........................... 229/92.8
5,510,992 A 4/1996 Kara
5,524,995 A 6/1996 Brookner et al.
5,573,277 A 11/1996 Petkovsek
5,598,970 A * 2/1997 Mudry et al. ................ 229/305
5,600,562 A 2/1997 Guenther
5,601,313 A * 2/1997 Konkol et al. ................. 283/81
5,602,743 A 2/1997 Fraytag
5,606,507 A 2/1997 Kara
5,615,123 A 3/1997 Davidson et al.
5,615,312 A 3/1997 Kohler
5,617,519 A 4/1997 Herbert
5,650,934 A 7/1997 Manduley
5,666,284 A 9/1997 Kara
5,717,597 A 2/1998 Kara
5,774,886 A 6/1998 Kara
5,778,076 A 7/1998 Kara et al.
5,791,553 A 8/1998 Fabel
5,796,834 A 8/1998 Whitner et al.
5,801,364 A 9/1998 Kara et al.
5,801,944 A 9/1998 Kara
5,805,810 A 9/1998 Maxwell
5,812,991 A 9/1998 Kara
5,819,240 A 10/1998 Kara
5,822,739 A 10/1998 Kara
5,825,893 A 10/1998 Kara
5,884,277 A 3/1999 Khosla
5,902,439 A 5/1999 Pike et al.
5,923,406 A 7/1999 Brasington et al.
5,924,738 A * 7/1999 Konkol et al. ................. 283/81
5,929,415 A 7/1999 Berson
6,005,945 A 12/1999 Whitehouse
6,010,156 A 1/2000 Block
6,026,385 A 2/2000 Harvey et al.
D434,438 S 11/2000 Kara
6,155,476 A 12/2000 Fabel
6,173,888 B1 1/2001 Fabel
6,208,980 B1 3/2001 Kara
6,209,779 B1 4/2001 Fabel

FOREIGN PATENT DOCUMENTS

| | | |
|---|---|---|
| JP | 05-132049 | 5/1993 |
| JP | 09-508220 | 8/1997 |
| JP | 63147673 | 6/1998 |
| WO | WO95/17732 | 6/1995 |
| WO | WO-95/19016 | 7/1995 |
| WO | WO97/14085 | 4/1997 |
| WO | WO98/14909 | 4/1998 |

OTHER PUBLICATIONS

Office Action issued on Mar. 13, 2007 for JP 515,253/97; with English language translation (4 pages).
Stamps: Beyond Elvis, May 15, 1994, New York Times Archives, 2 ppgs.
Minnick, Robert, “Postage Imprinting Apparatus and Methods for Use With a Computer Printer”, Apr. 27, 1995, 71 ppgs.
Office Action issued for Japanese Patent Application No. 515,253/1997, issued on Apr. 21, 2009; 5 pages (with English language translation).

* cited by examiner

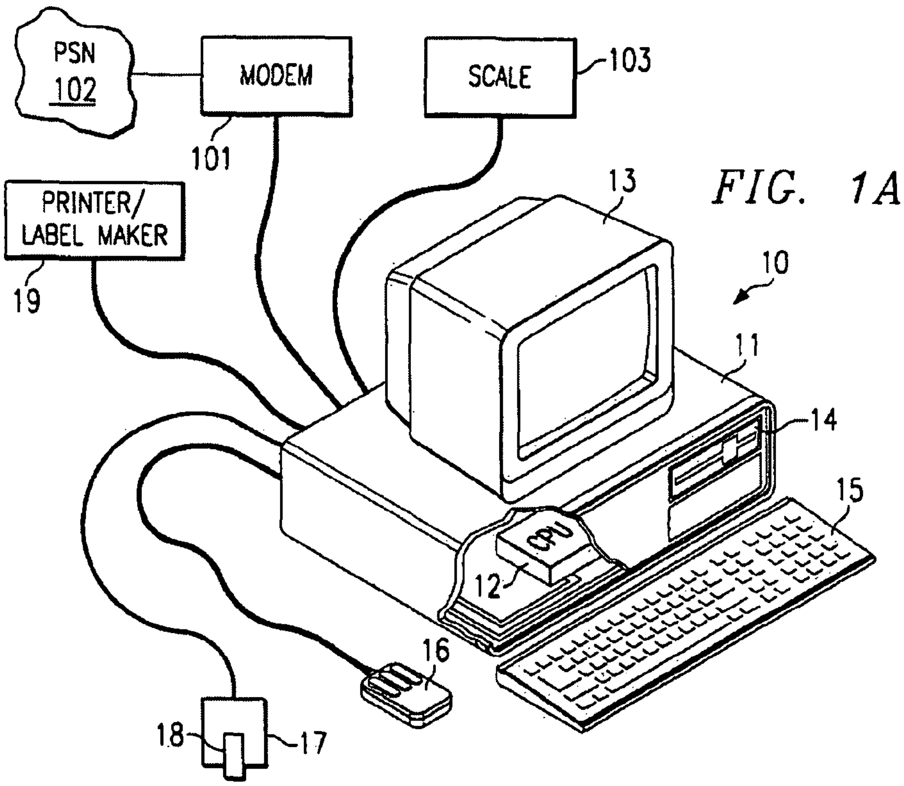
FIG. 1A
FIG. 1B
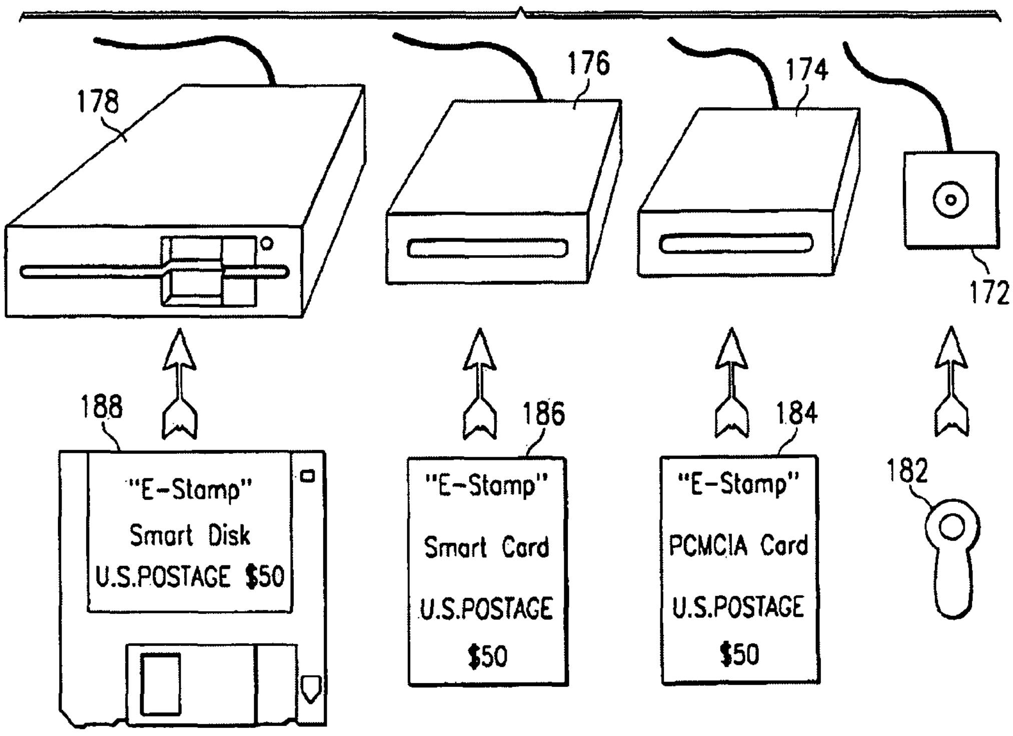

E-Stamp Corporation
3050 Post Oak Blvd., Suite 110
Houston, Tx 77056-6524

Telephone (713)871-9799 Fax (713)871-0139

"E-Stamp"™ - Registration form

31 T.M.U. Button Serial #000000001 Date: April 20, 1994 } 33
32 E-Stamp Serial #000000001 Time: 01:29 AM 35 {
Registered user:
Individual Salim G. Kara Social Security # 636-18-0137
Organization Global Impex, Inc. Employer I.N. # 76-0422781
Address: 3050 Post Oak Blvd.
Suite 110
City: Houston State: Tx Zipcode+4: 77056-6524
Telephone: (713)871-9799 Fax: (713)871-0139

E-Stamp Corporation License Agreement

38 {
This is a legal agreement between you (an individual or an entity), the end user, and E-Stamp Corporation. If you do not agree to the terms of this Agreement, promptly return the disk package and accompanying items (including all hardware, written materials and binders or other containers) to the place you obtained them for a full refund.

License
1. Grant of License.
2. Term of License.
3. Copyright.
4. Other restrictions.
5. Limited warranty.
6. Customer remedies.
7. No Other Warranties.
8. No Liability for Consequential Damages.

37

*FIG. 3*

Level 1: Password.

BCLINTON

Level 2: Algorithm 1.

p1 = (d1 + d4 + d7 + d10 + d13 + d16) mod 256
p2 = (d2 + d5 + d8 + d11 + d14 + d17) mod 256
p3 = (d3 + d6 + d9 + d12 + d15 + d18) mod 256
p4 = (d19 + d22 + d25 + d28 + d31 + d34) mod 256
p5 = (d20 + d23 + d26 + d29 + d32 + d35) mod 256
p6 = (d21 + d24 + 27 + d30 + d33 + d36) mod 256
p7 = (d37 + d38 + d39 + d40 + d41 + d42) mod 256
p8 = (d43 + d44 + d45) mod 256

Level 3: Algorithm 2.

p1 = d1 mod 256
p2 = (d2 + d3) mod 256
p3 = (d4 + d5 + d6) mod 256
p4 = (d7 + d8 + d9 + d10) mod 256
p5 = (d11 + d12 + d13 + d14 + d15) mod 256
p6 = (d16 + d17 + d18 + d19 + d20 + d21) mod 256
p7 = (d22 + d23 + d24 + d25 + d26 + d27 + d28) mod 256
p8 = (d29 + d30 + d31 + d32 + d33 + d34 + d35 + d36 + d37 + d38 + d39 + d40 + d41 + d42 + d43 + d44 + d45) mod 256

*FIG. 6*

SYSTEM AND METHOD FOR PRINTING MULTIPLE POSTAGE INDICIA

CROSS-REFERENCE TO RELATED APPLICATIONS

This application is a continuation of co-pending, commonly assigned, U.S. patent application Ser. No. 09/491,949 filed Jan. 26, 2000 entitled "SYSTEM AND METHOD FOR PRINTING MULTIPLE POSTAGE INDICIA," which itself is a continuation of, commonly assigned, U.S. patent application Ser. No. 08/965,015 filed Nov. 5, 1997, now U.S. Pat. No. 6,208,980, entitled "SYSTEM AND METHOD FOR PRINTING MULTIPLE POSTAGE INDICIA," which itself is a continuation-in-part of, commonly assigned U.S. patent application Ser. No. 08/561,417 filed Nov. 21, 1995, now U.S. Pat. No. 5,801,944 entitled "SYSTEM AND METHOD FOR PRINTING POSTAGE INDICIA DIRECTLY ON DOCUMENTS," which itself is a continuation-in-part of, commonly assigned U.S. patent application Ser. No. 08/540,658 filed Oct. 11, 1995 now U.S. Pat. No. 6,208,980 entitled "SYSTEM AND METHOD FOR PRINTING PERSONALIZED POSTAGE INDICIA ON GREETING CARDS", which are hereby incorporated by reference herein. Reference is hereby made to and commonly assigned U.S. patent application Ser. No. 08/892,946, filed Jul. 15, 1997 now U.S. Pat. No. 6,195,556 entitled "SYSTEM AND METHOD FOR PROVIDING FAULT TOLERANT TRANSACTIONS OVER AN UNSECURED COMMUNICATION CHANNEL," which is incorporated herein by reference.

TECHNICAL FIELD

This invention relates, in general, to printing postage indicia on mail. More specifically, the invention relates to a system and method for creating postage indicia in conjunction with a word processing document and for displaying and/or transferring the indicia on the front of an envelope. The system will calculate the postage due and personalize the postage indicia.

BACKGROUND OF THE INVENTION

The use of word processors running on general purpose computers is so common place today as to be taken for granted. Children, as well as adults, use such word processing programs to create, format and print (in selected colors, fonts and size) every conceivable type of document. These systems are used to create all manner of designs and to print the creations on all manner of printable material in addition to paper. One example for the use of such processors that has become very popular is to use them for the creation of account statements or paper checks. This use is typically in conjunction with an accounting program. Another use is the creation of T-shirt designs and the subsequent printing of such T-shirts (or other material) under control of the user.

Often, the document that is created by the user in the processor (for example, a letter, an invitation, an invoice, or a check) is then mailed to some other location. This entails the placing of the document (or other material) in a mailing container (envelope), addressed, and supplied with sufficient postage.

Additionally, a return document is often required or solicited from the recipient of the initial mailing. This requires the sender to also supply sufficient postage for the return communication or requires the recipient/respondent to supply and affix postage.

Many of the programs in use today print the mailing address (as taken from the document) on labels which are printed in conjunction with the creation of the document. These labels then are peeled off the document and transferred to the outside of the mailing envelope to save the user time and to avoid placing the envelope in the printer or otherwise addressing the envelope.

However, using such system the user still must add postage to the mailing envelope manually or the user must run the mailing container (envelope) through a postal meter. At best, this is one additional step. At worst, in the case of a nonconforming mailing container such as a carton, several additional steps are required.

Moreover, where a return document is solicited, the sender must find a way to include sufficient return postage. This presents several problems as often the return mailing container is unknown to the sender, as it may be provided by the recipient/respondent, thus presenting no clear choice to the sender as to where to apply the proper return postage. Even where the return mailing container is known to the sender, application of the return postage to this container requires additional steps to be performed by the sender. For example, in the case of providing the return envelope or in the case of an R.S.V.P. post card, the sender must still add the postage manually or run the mailing container (envelope) through a postal meter. Often these dilemmas are resolved by the sender foregoing the return postage, relying on the recipient/respondent to provide this necessary element. However, reliance on a recipient/respondent to contribute the extra cost and effort associated with providing such return postage may cause the recipient/respondent to fail to respond.

Furthermore, the customer is limited in the graphic configuration of the postage applied to the letter to those configurations printed and sold by the Post Office. Currently, the customer does not have the ability to create a customized postage indicia that would correspond to the message on a particular document such as the aforementioned invitation and/or R.S.V.P. card.

Accordingly, there is a need in the art for a system and method that provides for the printing of an appropriate amount of authorized postage by the same general purpose processors that allow the customer to create documents.

Thus, it is an object of the present invention to provide a means for the customer to enter the appropriate rate determining information such as the address to which the customized greeting card is being sent, what class of mail is being used, etc. Likewise, it is an object of the present invention to provide a means for the customer to enter rate determining information for the return correspondence solicited. Thereafter, the processing system that formats and prints a document may concurrently calculate the appropriate postage for the greeting card and/or a return item and print the appropriate postage for that particular document at the same time the document is being printed.

BRIEF SUMMARY OF THE INVENTION

The present invention fulfills the needs discussed above by disclosing a method and a system whereby a customer may automatically calculate the correct amounts of postage, print the correct amounts of postage, personalize selected stamp indicia, and print address labels at the same location where the customer generates a document and/or a return document, such as a customized greeting card and associated R.S.V.P. card.

In accordance with one aspect of the present invention, a general purpose computer based system is disclosed which operates in conjunction with a conventional word processing program, check creation program or with any other program that can format and control the printing of user controlled documents to allow the user to automatically calculate the correct amount of postage for that document and to print that postage at the same time the document is being printed. Moreover, as the document may include, or otherwise be associated with, a return document, the present invention operates to allow the user to automatically calculate the correct amount of postage for the return document. This return postage may be printed in any number of ways, such as upon the return document itself or on a transfer section, on either of the documents or discrete therefrom, in order to be applied to a return mailing container.

In one embodiment, the printed postage indicia is put in a corner of either or both documents so that, after the document is placed in an envelope, the postage will show through a glassine "window" created in the envelope. Of course, where the return document is itself a detachable portion of the original document, the printed postage indicia is placed so as to properly show through the window when the return document is detached and placed in an envelope.

In another embodiment, either or both postage indicia are printed on a transfer sheet and physically transferred to the outside of the mailing envelope or package. This transfer sheet may be discrete from the documents, or may be a predefined transfer section of the documents having a transfer media, such as a removable pressure sensitive label, included thereon.

The discussed system can also generate postage which includes a personalized postage indicia which may also contain an encrypted message, such as ZIP+4, as a function of mailing parameters entered into the system and particular to the associated document.

One technical advantage of this invention is that a printer can create a document and an associated return document, as well as the postage to mail both documents during one pass across the blank writing medium.

A further advantage of this system is that the user can select a postage indicia from a menu of available graphic configurations to correspond with the type of document being generated and the system will print the postage as part of the document.

Yet another advantage of this system is that the postage generated by the system will have a ZIP+4 information printed on it which makes that piece of mail easier to sort, route and deliver.

The foregoing has outlined rather broadly the features of the present invention in order that the detailed description of the invention that follows may be better understood. Additional features of the invention will be described hereinafter which forms the subject of the appended claims. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates a processor-based system for implementation of the present invention;

FIG. 1B illustrates several embodiments of the postage storage device;

FIG. 3 illustrates an embodiment of a user registration form;

FIG. 6 illustrates a preferred embodiment of the security techniques utilized within the present invention;

DETAILED DESCRIPTION OF THE INVENTION

The present invention provides for a portable postage storage device, described in more detail below, that can be coupled to a general purpose processor-based system that interacts with a customer to generate a document, or other piece of mail.

The present invention further provides for a method and system, described in co-pending U.S. application Ser. No. 08/263,751 and incorporated herein by reference, for automatically calculating the appropriate amount of postage for a piece of mail, printing that amount of postage and deducting the printed amount of postage from the total amount of postage stored within the portable postage storage device. In addition, the present invention allows the user to retrieve, select, personalize and print postage indicia.

The present invention will allow an amount of authorized postage to be loaded into a portable postage storage device by the U.S. Post Office via a processor-based system hereinafter referred to as the "POSTAGEMAKER" program. Although reference is often made to the U.S. Post Office, the present invention may be implemented within any country and with respect to any postal or private parcel system.

The loaded postage may be accessed and a portion of that postage retrieved via a program stored on a processor-based system, such program hereinafter referred to as the "E-STAMP" program. The E-STAMP program may be stored on a processor-based system that also contains a document generating system. The document generating system may be used to generate customized mail, as for example personalized greeting cards.

A detailed discussion of the inventive concepts of this invention will now be made with respect to FIGS. 17 through 21. A detailed discussion of the general system operation is contained in this disclosure hereinafter with respect to FIGS. 1A through 16B. The user is referred to the subsequent discussion to gain an understanding of how the general purpose processor works in conjunction with the portable processor to control the dispensation and creation of postage indicia.

Figure 17:
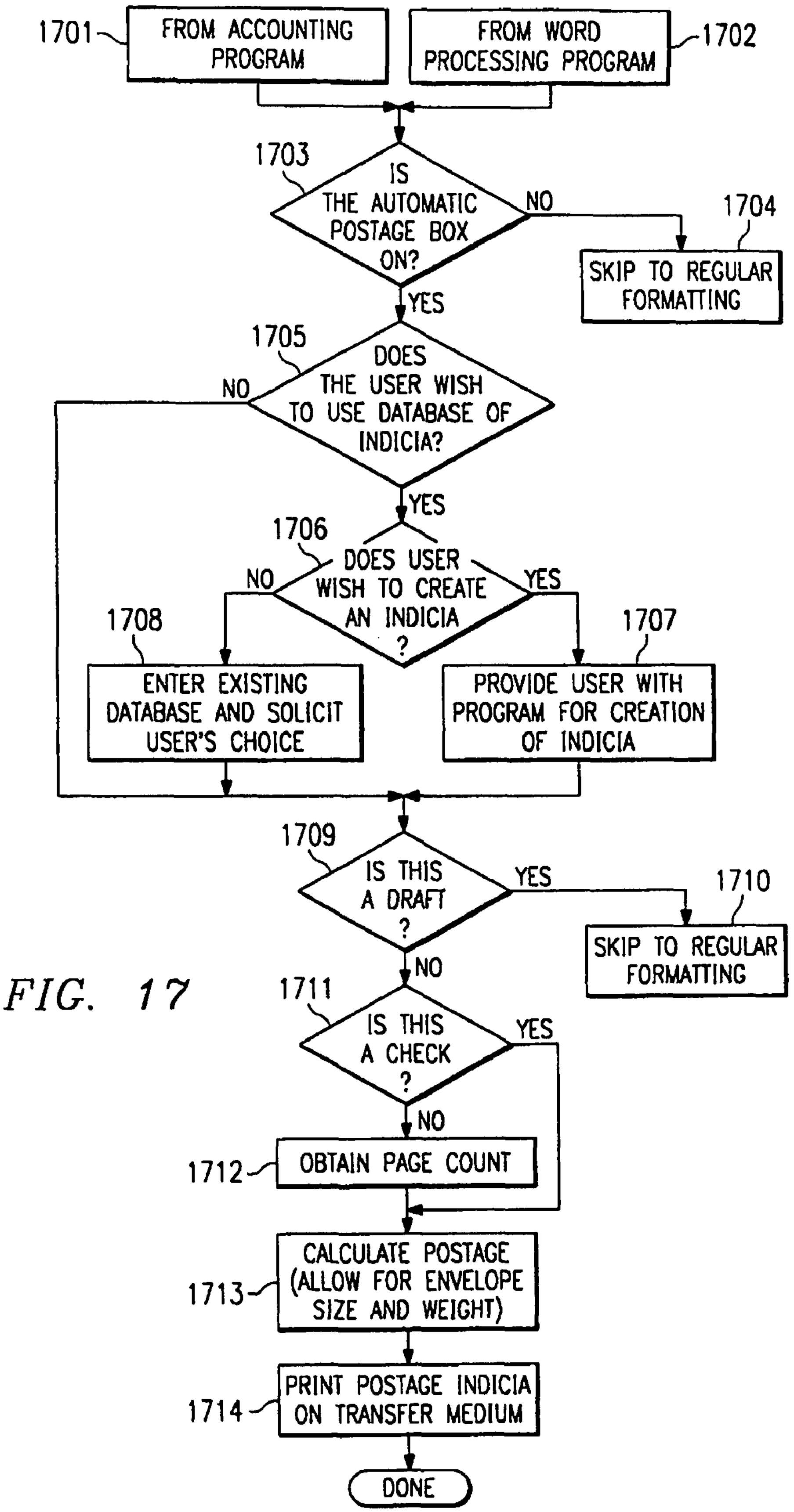
FIG. 17 is a flow chart of system operation working in conjunction with another word processing program.

Referring now to FIG. 17 two embodiments of the invention are shown, one proceeding from accounting processing program 1701 and the other from word processing program 1702. It should be noted that these programs are well-known in the art and are typical of the many application types available for document preparation which may be utilized according to the present invention. For example, a typical well-known accounting program is available to the general public from Intuit Corporation and is licensed under the trade name "Quicken". Available to every user with the "Quicken" program is a manual of operation of the "Quicken" system, which is hereby incorporated by reference herein.

Similarly, a typical well-known word processing program could be, for example, the "Word" system from Microsoft. Also included with each word processing program from Microsoft is a manual of operation giving extensive details of the operation of the "Word" system from a user's perspective. Such manual is hereby incorporated by reference herein.

Of course, use of the present invention is not limited to the use of such word processor or accounting programs, but in fact may operate with any number of programs which operate to produce documents to be transmitted via mail. Moreover, the present invention may be operated completely autonomously to, for example, apply postage to previously created postal documents.

Decision box 1703 makes a determination of whether the automatic postage box is on. The automatic postage box, for example, would be a designation made by the user of either the accounting program or the word processing program contained within that system as to whether postage is to be generated for the particular document being created. Where a return document is associated with the generated document, decision box 1703 may also make a determination as to whether multiple postage indicia are to be generated and/or a location or position for printing each.

Obviously, if the answer to whether postage is to be generated for the particular document being created is no, the program then would skip to the regular formatting of the accounting program or word processing program or whatever other program is being run as shown in box 1704.

If the answer is yes, then the user is queried in box 1705 as to whether he/she wishes to use a database of indicia that have already been created.

If the answer is no, the program skips to box 1709. If the answer is yes, then the program goes to box 1706 where the user is asked whether the user wishes to create his/her own indicia or whether the user wishes to modify indicia.

If the user wishes to create his/her own indicia, then the user is referred to box 1707 where a drawing program is provided for the creation of the indicia. One such program can be the Macromedia Free-Hand program which is available to the general public and which comes with an operating manual, which operating manual is hereby incorporated by reference herein.

If the user, as shown in box 1706, simply wishes to modify an existing indicia, then the user is referred to box 1708 where the existing database is made available and the user selects the indicia of the user's choice and either uses it directly or modifies it.

Where multiple indicia are to be generated, the user may in fact select two indicia from a database or create two indicia. Of course, there is no limitation to the multiple indicia being generated in the same fashion. For example, the user may select an indicia from a database for the outbound document and create a personalized indicia for the return document. Likewise, the user may simply elect the use of multiple indicia and allow the system to select a default indicia, rather than performing any customization, if desired.

When modification is finished, the user is then referred back to box 1709 and determination is made as to whether this is a draft. The reason for this is that if it is a draft, there is no need to print the postage thereon.

If it is a draft, then the program moves to box 1710 and returns to the controlling word processor program where regular formatting and printing is controlled.

However, in box 1709, if this is a final version, a determination is made via box 1711 as to whether this is a check or other such single page document. If it is a check, then the amount of postage is calculated allowing for the envelope size and weight in box 1713.

However, if this is a word processing program or other program producing a multi-page document, the page count is obtained via box 1712 from the controlling word processor program in box 1702 so that the system can, based upon the number of pages, calculate the amount of postage that will be due and, as shown in box 1713, allowing for the envelope size and weight as well as the inclusion of any discrete return document and/or container, will determine the amount of postage to be printed. Of course, where a return document is associated with the outbound document, this same determination may be made for the return document's postage.

Box 1714 prints the postage indicia. The indicia may be printed on a transfer media on the document or they may be printed directly on the document and/or return document, for situations where the postage is going to be used in a glassine-type envelope or otherwise transferred to a user without a peel-off label, as will be discussed.

Figure 19:
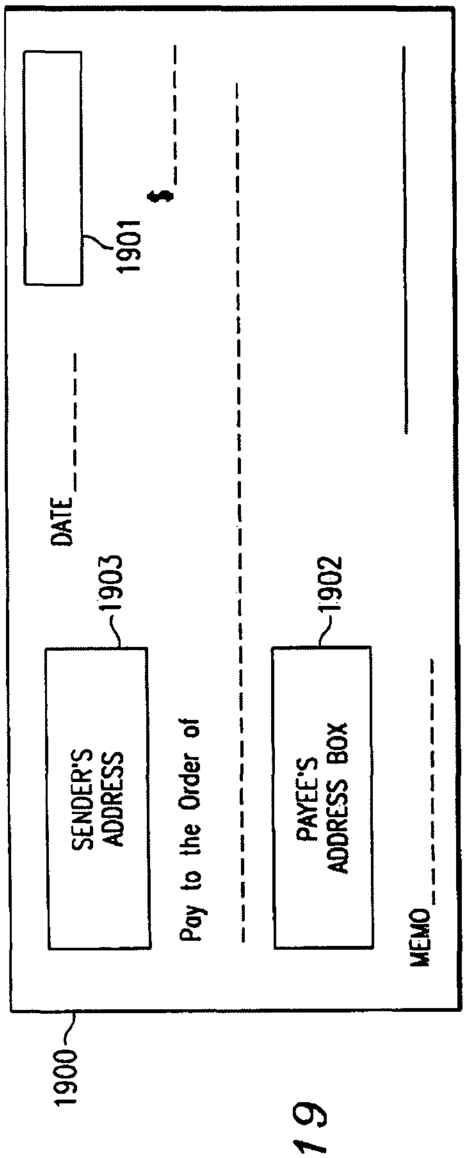
FIG. 19 shows a check with the postage indicia printed on the face of the check.

In FIG. 19 there is shown a check 1900 with sender's address location 1903, payee's address box 1902 and having a place 1901 for the printing of the postage.

Figure 20:
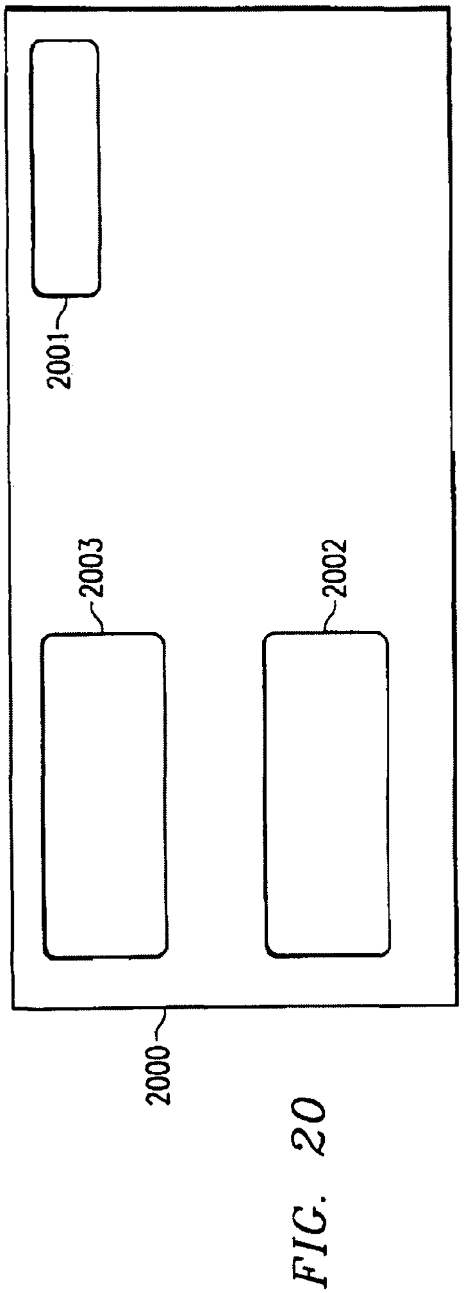
FIG. 20 shows an envelope having a transfer mechanism for showing the postage to a viewer outside the envelope.

Location 1901 is where the postage indicia is printed. However, located at Location 1901 can be a label which is peeled off and which thereby allows the user to transfer the postage to the outside of an envelope, such as envelope 2000. Location 1901 also could be an ink type that when printed on establishes a special transfer facility such that when the check is placed in an envelope of the proper type, a like position, such as position 2001 of envelope 2000 shown in FIG. 20 is in juxtaposition with Location 1901 will react with the ink medium or other special transfer facility of 1901, thereby presenting to a viewer on the outside of the envelope, the postage indicia on the inside.

In this manner a transfer occurs between postage printed on check 1900 and the outside of envelope 2000 without the need for removing and repasting the label. This transfer could occur as a chemical reaction or otherwise under perhaps heat control as generated by a user's finger or by any other mechanism desired. Of course, boxes 2001, 2002, and 2003 of FIG. 20 can be a glassine window which allows a viewer to see the postage printed at position 1901, payee's address box 1902, or sender's address location 1903 of check 1900.

Figure 18:
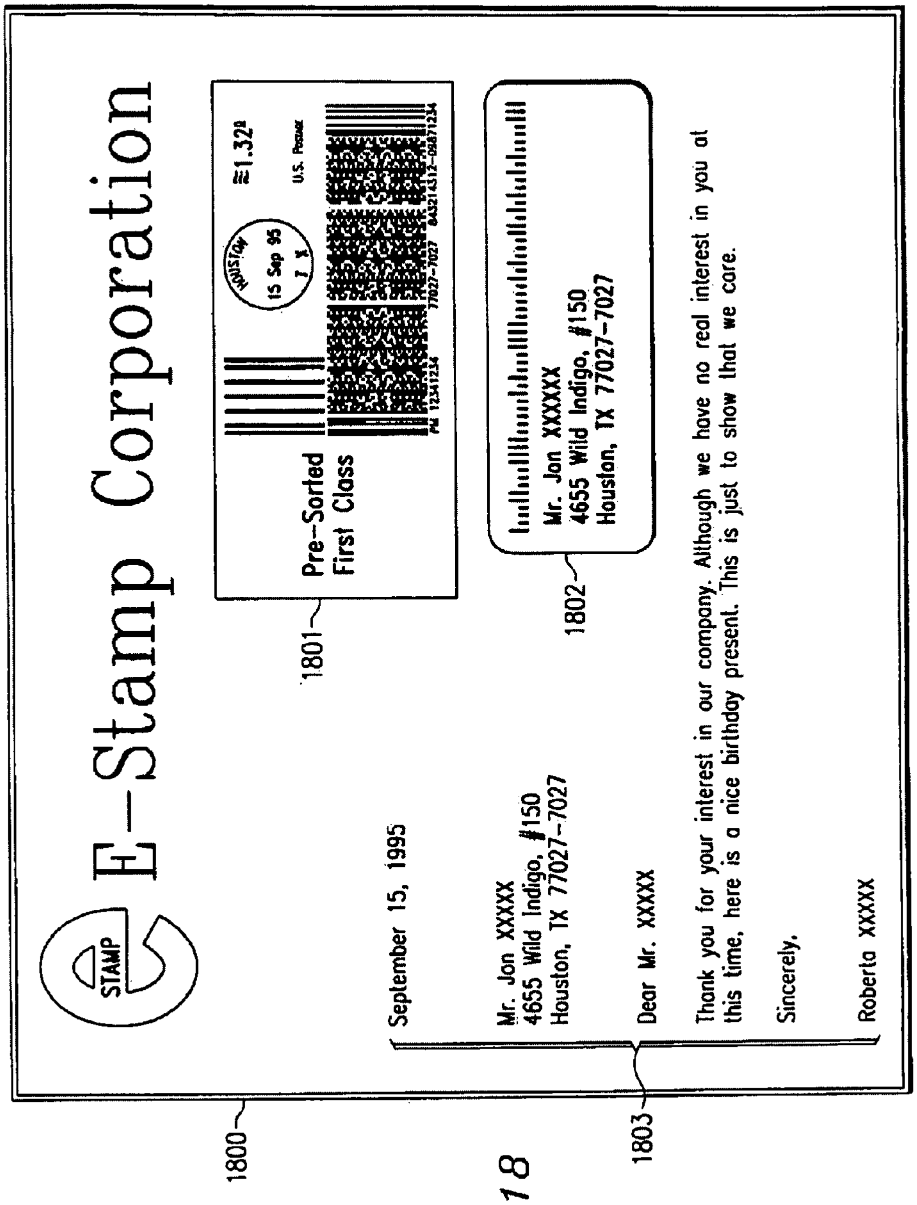
FIG. 18 is a view of a document having on it a transfer mechanism for moving the printed indicia from the document to the front of the envelope.

FIG. 18 shows a letter 1800 having a body of the letter in 1803 with a postage indicia label 1801 and an address label 1802. As just discussed, postage indicia label 1801 could be removed and positioned on the outside of an envelope or the indicia could be imprinted directly on the document and the document folded such that position 1801 of letter 1800 will show through window 2001 of envelope 2000 in FIG. 20.

Postage indicia label 1801 may include two postage indicia, one outbound and one for the return document (not shown). For example, postage indicia label 1801 might be "kiss cut" horizontally in order to provide for the printing of the two indicia. In this way, the outbound indicia might be folded or transferred as discussed above while the return document indicia is preserved for use by the recipient/respondent. Such an embodiment might be preferable where, for example, the return document is not generated by the system or is to be provided by the recipient/respondent. Thereafter the postage indicia may be removed for use with the proper document or its mailing container. Alternatively, the document containing the second postage indicia may be re-folded so as to display the second indicia for a return trip through the postal system.

Address label 1802 could be utilized in the same manner or the address label 1802 not printed at all and a viewer view the name through a glassine window such as window 2002 of envelope 2000 in FIG. 20.

Figure 21:
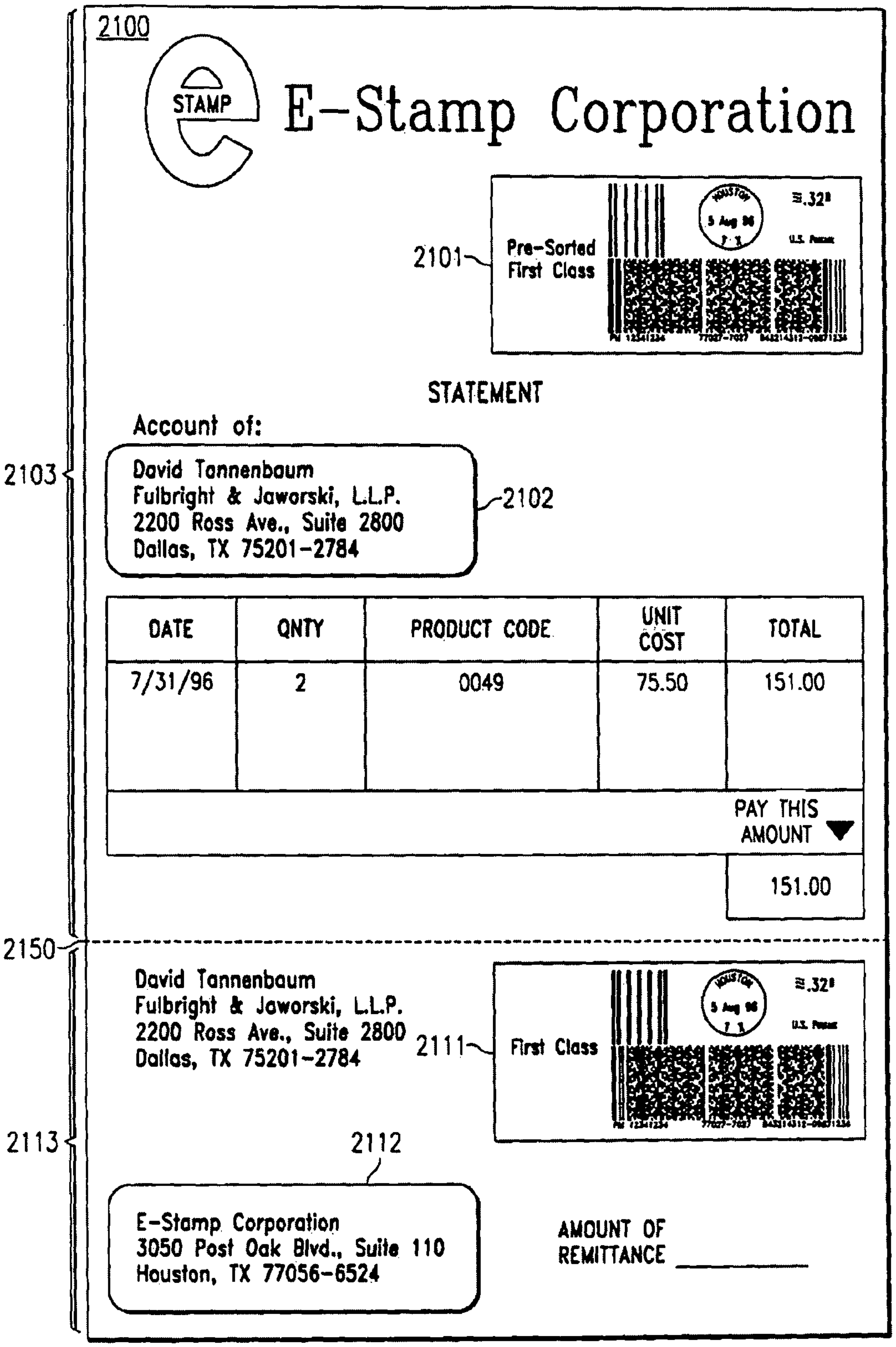
FIG. 21 shows a statement having a return document portion with a sending postage indicia and a return postage indicia both on the face of the document.

FIG. 21 shows document 2100 including outbound document portion 2103 with a postage indicia label 2101 and address label 2102. Document 2100 also includes return document portion 2113 with postage indicia label 2111 and address label 2112.

Outbound document portion 2103 and return document portion 2113 are demarcated for easy separation by perforation 2150. Of course, the outbound document and return document need not be attached according to the present invention. For example, each document may be a discrete document created by the same or different program operating with the aforementioned system, such as may be the case with an invitation and R.S.V.P. card.

The postage indicia labels of FIG. 21 may be utilized in any number of ways. As described above, the entire document may be folded so as to properly display outbound postage indicia label 2101 through an envelope window. Thereafter, return document portion 2113 may be separated and placed in an envelope by the recipient/respondent so as to properly display return postage indicia label 2111. Alternatively, either or both postage indicia labels may be transferred from their respective documents to a corresponding mailing container. Of course, where either or both documents do not require a mailing container, such as the case of a postcard, no manipulation of the document or postage indicia label may be needed. Moreover, although the postage indicia have been discussed with references to a label, it shall be understood that the use of a removable label portion is completely optional and the postage indicia may, in fact, be printed directly upon the document media.

As described in detail below, the printed meter stamp may display a date, such as a date of posting. Likewise, the meter stamp may include information such as a place of posting, i.e., a ZIP code, identification of a meter responsible for generating the meter stamp, etcetera.

However, as the date of posting of a return document and/or other specific information such as a place of posting typically cannot be predicted, a preferred embodiment of the second postage indicia includes information to allow the authorized posting of the return document. This information may include a date on or before which the item must be posted in order for the indicia to be considered valid. Similarly, the information may include an indication that the meter stamp was generated by a particular meter but is expected to be posted from a distant ZIP code. Alternatively, the information may include the location from which the return mail is to be sent in order for the indicia to be considered valid.

The information may be in human readable form, such as an alpha numeric date, in order to apprise the recipient/respondent of validity constraints on the return postage. Additionally, or alternatively, the information may be in machine readable form, such as the graphical security interface discussed in detail below.

General System Operation

Referring to FIG. 1A, there is illustrated a processor-based system 10 utilized for implementing the present invention, specifically the aforementioned E-STAMP and POSTAGE-MAKER programs. System 10 includes chassis 11 enclosing processor ("CPU") 12 and disk drive 14. System 10 is a general purpose computer, such as an IBM compatible (or Apple Macintosh) controlled by any general purpose operating system such as DOS or UNIX. Coupled to CPU 12 is display 13, keyboard 15 and mouse 16.

Furthermore, system 10 is adapted for coupling with a postage storage device 18, such as the preferred embodiment touch memory utility ("TMU") button 182 illustrated in FIG. 1B. Postage storage device 18 is coupled to the processor-based system 10 through a postage storage device receptor 17.

The postage storage device may be any memory device having some residual data capability, where that memory device can provide sufficient security measures to efficiently limit access to the memory of the device to authorized users. For example, since algorithms can be used to control access to the memory device, a standard "diskette" can be used if desired.

The preferred embodiment, TMU button 182, incorporates a small disk having a memory. TMU button 182 is a small, light-weight, portable, essentially non-breakable device available from Dallas Semiconductor, Dallas, Tex. A TMU button 182 may be coupled to processor-based system 10 through button holder 172. In a preferred embodiment of the present invention, a batch of TMU buttons will be manufactured with specifically designated serial numbers for use solely with the present invention.

An advantage of the preferred embodiment (the TMU button 182) is that a TMU button 182 is small enough and light enough that several may be carried in one hand. Furthermore, the TMU button 182 is sufficiently durable to be hand-carried from one location to another. The fact that the portable memory is universally usable with any PC equipped with a button holder 172 allows the per unit cost of TMU buttons 182 to be lower.

A preferred embodiment of the above described TMU button is disclosed in the co-pending commonly assigned, U.S. application entitled "SYSTEM AND METHOD FOR PROVIDING FAULT TOLERANT TRANSACTIONS OVER AN UNSECURED COMMUNICATION CHANNEL," previously incorporated herein by reference. This preferred embodiment includes a TMU button having a processor operating under control of a limited purpose operating code providing secure data storage and interaction.

Additional alternative embodiments of the postage storage device 18 are illustrated in FIG. 1B. One alternative postage storage device 18 is a smart disk 188 incorporating its own electronic modules capable of read/write operations. One embodiment of such a smart disk 188, SMART DISK™, can be obtained from Smart Disk Security Corporation, Naples, Fla. The smart disk looks like a floppy disk and fits into a typical PC's floppy disk drive, connected either externally or internally to processor-based system 10; however, smart disk has its own microprocessor that provides secure, password protected storage. One advantage of the smart disk is that it can operate in a standard PC disk drive 178 without modification to the disk drive or PC. Smart disk provides security for stored postage with an encrypted password and the encryption algorithm.

Another type of postage storage device 18 is a smart card 186, a plastic card embedded with a microchip. The microchip contains mathematical formulas that encrypt computer data to secure access to that data (i.e., postage) and verify a user's identity before allowing access to the data. One drawback in the currently available smart cards 186 is that they require a card reader 176 hooked to the processor-based system 10.

Still another type of postage storage device 18 is a PCMCIA card 184. PCMCIA cards are currently used on notebook computers for modular storage and communication. Both external and internal add-on hardware 174 (i.e., card slots) are available for PCs.

The portable memory can contain data fields with specific information, such as passwords, stored therein at particular locations. The portable memory could also contain, for example, a timer, a counter, a graphics program, a bar code program, or any one of a plurality of other "active" elements which can be incorporated into the operation of the system.

Before an individual can become an authorized user of an E-STAMP program, he/she must first acquire a copy of the program, register his/her copy of the program with E-Stamp Corporation, or other vendor or authorized agent, and execute a license agreement with E-Stamp Corporation for the use of E-STAMP. There are at least two ways to acquire and register an E-STAMP program.

One way to acquire and register an E-STAMP program is for the individual to communicate directly with E-Stamp Corporation to obtain site licenses for whatever number of E-STAMP programs he desires to use, the desired number of postal storage devices 18, and a registration card containing a E-Stamp Corporation serial number for each postal storage device 18.

Figure 2:
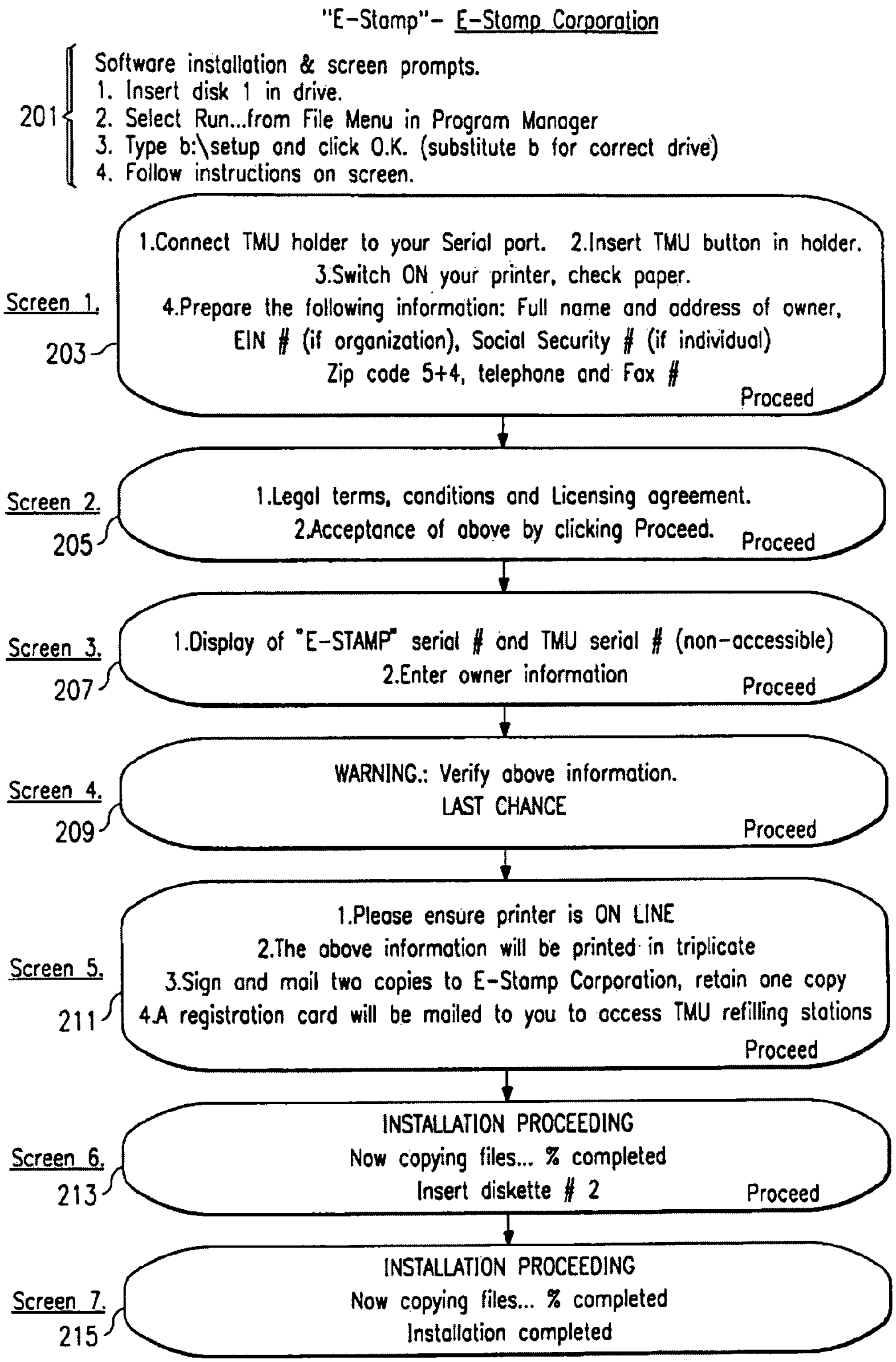
FIG. 2 illustrates an embodiment of user instructions and screen prompts utilized by the present invention to interface with a user when installing the program on the processor-based system for implementation of the present invention.

Alternatively, an individual may acquire the E-STAMP program at any E-STAMP retail outlet. For example, an individual can buy a postage storage device 18, containing a small quantity of postage, with a copy of the E-STAMP program. That individual will then install the E-STAMP program on a processor-based system 10. FIG. 2 illustrates one embodiment of the instructions and screen prompts to be followed by the individual during the installation of the E-STAMP program. The instructions and screen prompts illustrated in FIG. 2 reflect the installation of the E-STAMP program in a "windows" operating environment on a PC equipped with a TMU button 182 and button holder 172. Of course, other means could be employed for implementing the present invention within a processor-based system 10.

The installation instructions 201 inform the individual, or user, how to pull up the E-Stamp installation program. Once the installation program is initiated, screen 203 will appear. Screen 203 instructs the user to connect the TMU holder 172 to a serial port and to insert the TMU button 182 into the holder 172. The user is then instructed to turn on a printer 19 that has been coupled to the processor-based system 10 and check to see that the printer 19 is supplied with paper. Screen 203 further requests that the user prepare the following information: the user's full name and address, an identification number for the authorized user (i.e., an employer identification number (EIN#), if the user is a business or organization; or a social security number (SS#), if the user is an individual), the user's ZIP code, the user's telephone number and the user's fax number. The next screen, screen 205 displays the E-Stamp Corporation License Agreement with its legal terms and conditions. Acceptance of the terms and conditions set out in the license agreement is indicated when the user continues with the installation program.

Next, screen 207 will appear and display the E-STAMP serial number and TMU serial number. At this time the user-specific information requested in screen 203 should be entered into the E-STAMP program. Once the user has entered the user-specific information, screen 209 will appear warning the user to carefully verify the correctness of the entered information.

After verifying the information added into the E-STAMP program, screen 211 will remind the user to ensure that a coupled printer 19 is on line. The user information entered into the E-STAMP program will then be incorporated into a user registration form, one embodiment of which is illustrated in FIG. 3. The E-STAMP registration form will be printed in triplicate. The user is instructed to sign and mail two copies of the registration form to the creator of the E-STAMP program, E-Stamp Corporation and to retain one copy of the registration form. Screen 211 also informs the user that a registration card will be mailed to the user in order that the user may access TMU refilling stations.

The E-STAMP installation program continues with screen 213, which describes the progress being made in installing the E-STAMP program, and screen 215, which informs the user when the E-STAMP program installation has been completed.

Referring to FIG. 3, there is illustrated a preferred embodiment of the E-STAMP registration form. The registration form includes information such as the TMU button serial number 31, the E-STAMP serial number 32, the date and time that the E-STAMP program was installed 33, and user-specific information 35 (e.g., name, address, telephone and fax numbers, and identification number), and a copy of the E-Stamp Corporation License Agreement 38 having an identified location for the user to sign. A preferred embodiment of the E-STAMP registration form will also contain all of the information needed to specifically identify the TMU button 182, E-STAMP program, and registered user in an encrypted format 37. The encrypted information 37 will be in a machine-readable graphical security interface such as a standard bar code.

The standard bar code contains white and dark areas in the form of bars that can be read by a laser scanner. The laser scanner illuminates the white and dark areas with a light of a certain frequency. The light is reflected back to the laser scanner in such a way as to indicate the pattern of white and black areas within the bar code. Since white areas reflect much more light than dark areas do, a perpendicular scan of the bar code will allow the scanner to translate the reflected light into the coded information. More than 20 linear bar code languages have been developed, each with its own specifications for how many bars and spaces make up a character, how characters are to be arranged, whether the characters can be letters as well as numbers, and so forth. The most widely-used bar code is the Universal Product Code (UPC) seen on everyday grocery items. The standard bar code currently used by the Post Office is POSTNET ZIP+4 described in Postal Service Publication number 67.

More sophisticated graphical security interfaces have been developed over the last decade, such as Intermec Corporations' Code 49 and Laserlight System Inc.'s Code 16K. A major advantage of these more sophisticated graphical security interfaces is that they contain an error-correction formula which can often recover the entire message even if parts of the code have been torn or damaged.

A preferred embodiment of encrypted information 37 is a graphical security interface developed by Symbol Technologies of Bohemia, N.Y. and is called PDF417, a portable data file. PDF417 is a graphical security interface constructed from data units called "codewords," each of which is 17 modules long. Bars are made from filling in up to six consecutive modules and each unit has four separate bars and four spaces. In essence, PDF417 can stack the equivalent of up to 90 one-dimensional bar codes, each just three hundredths of an inch high. Thus, the PDF417 symbology is more complicated to produce and scan than is the typical one-dimensional bar code and allows for a denser coding of information. Because the PDF417 symbology specification includes sophisticated protocols for error-correction, the actual density of information is highly variable, but can be ten times the amount of information found in U.S.P.S. PostNet bar code, per square inch. PDF417 is available from Symbol Technologies, Inc., 116 Wilbur Place, Bohemia, N.Y. 11716 and the operation of the PDF417 is detailed in PDF Primer obtained from Symbol Technologies, Inc. and is hereby incorporated herein by reference.

When E-Stamp Corporation receives the signed E-Stamp Corporation License Agreement from the user, the encrypted information 37 can be scanned with a laser scanner so that the information contained therein can be automatically transferred to a registered user's database. When the encrypted information 37 has been transferred to the registered users database, a registration card containing an E-Stamp Corporation serial number will be printed and mailed to the registered user.

Once the user has obtained a registration card for each postal storage device 18, or TMU button 182, acquired, the user may then take that registration card with the user's TMU button 182, or other postage storage device 18, to the Post Office to be registered with the Post Office.

Until the TMU button 182 has been registered with the Post Office, the POSTAGEMAKER program will not recognize TMU button 182 as being an authorized postage storage device 18. Particular Post Office sites will have the POSTAGEMAKER program installed in a processor-based system. The POSTAGEMAKER program will allow a postal worker to interface the postage storage device 18 with the processor-based system residing at the Post Office in order to replenish the amount of postage programmed within the postage storage device 18 in an amount requested and purchased by the user.

To register a TMU button 182, or other postage storage device 18, with the Post Office a postal worker must enter the information on the E-Stamp Corporation registration card into the POSTAGEMAKER program. Such information will include the E-Stamp Corporation serial number, EIN# number or §#, TMU button serial number, and the address and telephone number of the registered user. Once all of this information has been entered into the system, the POSTAGEMAKER program will then recognize TMU button 182 and allow a postal worker to replenish the amount of postage stored within button 182 at the request of the user in a manner to be discussed below.

Alternatively, a pair of systems 10 may be linked together through public switched network ("PSN") 102, or other communication gateway such as the Internet or other computer network, via modem 101 or directly through digital telecommunications trunks or other communications links (not shown). Processor based systems 10 located at different U.S. Post Offices may be linked via PSN 102 in a conventional well known manner (such as through modem 101) so that information may be shared between the various Post Offices. Generally, a copy of the POSTAGEMAKER program will be stored within at least one processor-based system at selected U.S. Post Office locations. PSN linkage of processor-based systems 10 by the Post Office and the user will allow the sharing of information between the various Post Offices and will allow a user to call a number (an authorized Post Office number) and have the Post Office transfer the required amount of postage to a postage storage device 18 installed at a user site by modem. A preferred embodiment of a system and method for conducting transactions, such as that described above, is disclosed in co-pending commonly assigned U.S. application entitled "SYSTEM AND METHOD FOR PROVIDING FAULT TOLERANT TRANSACTIONS OVER AN UNSECURED COMMUNICATION CHANNEL," previously, incorporated herein by reference.

Figure 4A:
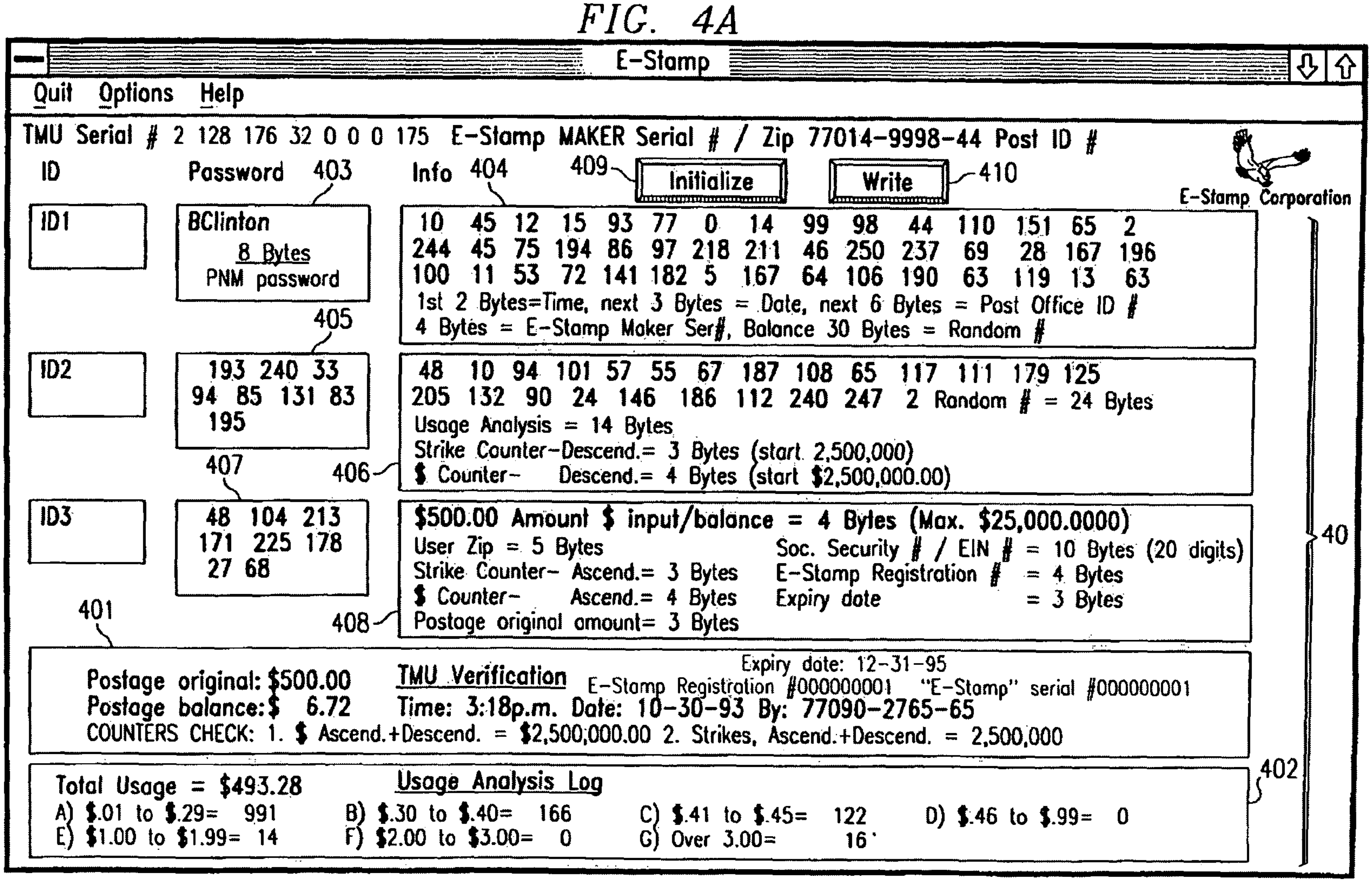
FIGS. 4A-4B illustrate a display screen utilized by the present invention to interface with a U.S. Post Office employee when replenishing postage within the present invention.

Referring to FIG. 4A, there is illustrated a preferred embodiment of a display screen shown on display 13 to a U.S. Post Office employee when accessing the present invention on system 10. Of course, the particular display aspects illustrated in FIG. 4A may be modified in any one of numerous ways. Also, in a preferred embodiment of the present invention, processor-based system 10 will provide for input from a user via keyboard 15 and mouse 16. However, other various forms of input available to processor-based systems may be utilized, such as a light pen or a touch-sensitive screen (both not shown).

At the upper right-hand corner of display screen 40, there is indicated an POSTAGEMAKER serial number, in this example "77014-9998-44." This serial number may include the ZIP code of the Post Office location, or may be selected at random. This serial number may also include a designation of a particular system 10 or a designation of the postal employee performing the transaction.

In the upper left-hand corner of display screen 40 is illustrated a TMU serial number, in this example "2 128 176 32 0 0 0 175." This serial number represents eight bytes of information stored within TMU button 182, each byte may represent any number from 0 to 255. A TMU serial number is specifically assigned to and will identify a specific TMU button 182. Thus, display screen 40 indicates that the postal employee has coupled an authorized TMU button 182 to a processor-based system 10 which incorporates the POSTAGEMAKER program.

Typically, the first two numerals (bytes) within the TMU serial number are assigned by the button (or memory) manufacturer. The third byte is selected by the U.S. Postal System and identifies TMU buttons 182 specifically designed for the POSTAGEMAKER program, excluding other TMU buttons 182 not designed for the POSTAGEMAKER program, such as disposable buttons, and assisting in the exclusion of any other means for accessing the POSTAGEMAKER program. As a result, the present invention may be design so that only authorized TMU buttons 182 may access the POSTAGEMAKER program for replenishment of postage as well be discussed below.

The remainder of the TMU serial number is basically the sequential serial number of that particular TMU button 182 in particular.

As the POSTAGEMAKER program reads the information stored within TMU button 182, the TMU serial number and the information in blocks 401 and 402 are displayed on display 13. The "TMU Verification" information in block 401 shows the date and Post Office location where the last addition of postage was electronically stored within button 182. As shown within box 401 of FIG. 4A, coupled TMU button 182 currently contains a postage balance of $6.72, which is most likely a portion of the postage that was input into button 182 at 3:18 p.m. on Oct. 30, 1993, at the Post Office having an ID number of "77090-2765-65." It may be observed that this serial number is different from the POSTAGEMAKER serial number shown at the upper right-hand corner of display screen 40, indicating that these numbers represent two different Post Office locations, and that button 182 was formerly coupled to a processor-based system 10 at Post Office "77090-2765-65" but is currently coupled to a processor-based system 10 residing at Post Office "77014-9998-44".

Box 401 also shows the expiration date of button 182, the user's E-Stamp corporation registration number, the user's E-STAMP serial number, and a strike and dollar counter check as will be described in more detail below. Box 402 is also displayed on screen 10 and itemizes the quantity of postage of designated values that has been used and subtracted from the postage stored in button 182. For example, box 401 of FIG. 4A show that $500.00 worth of postage was initially added to button 182 and that $6.72 worth of postage remains in button 182. This means that $493.28 worth of postage has been deducted from button 182. Box 402 of FIG. 4A shows that postage valued from $0.01 to $0.29 was subtracted from the amount of stored postage 991 times, that postage valued from $0.30-$0.40 was subtracted 166 times, that postage valued from $0.41-$0.45 was subtracted 122 times, that postage valued at $1.00-$1.00 was subtracted 14 times and that postage valued at more than $3.00 was subtracted 16 times.

In a manner to be discussed in detail below with respect to FIG. 5, the first password (i.e., BCLINTON) shown in box 403 is entered into the POSTAGEMAKER software. That password will be used to generate other passwords as described below and checked against the information stored in button 182. If the Post Office requests it, an extra password can be included to access and start the POSTAGEMAKER program. When the correct password for button 182 is entered into POSTAGEMAKER (i.e., BCLINTON), a string of numerals are generated as shown in block 404. In a preferred embodiment of the present invention, the first several numerals within block 404 represent the current time and date. A second string of numerals represent the POSTAGEMAKER serial number and the Post Office identification number. The remainder of the 45 bytes are generated randomly by the POSTAGEMAKER program. This generation of random numbers is detailed below.

Thereafter, a second password is generated from the numbers within block 404 through the application of an algorithm, an example of a second password is illustrated in block 405. These numbers are used as a second password to assist in the random generation of numerals within block 406.

In a preferred embodiment of the present invention, fourteen of the 45 bytes or numerals within block 406 represent a button usage analysis (i.e., how much of what value of postage has been used); three numerals (bytes) represent the number of strikes (or uses) that have been made and subtracted from a starting point of 2,500,000; and four numerals (bytes) represent the dollar value of postage used and subtracted from a starting point of $2,500,000. The remainder of the numerals are generated randomly by the POSTAGEMAKER program.

Thereafter, another algorithm utilizes the numerals generated within block 406 to derive the third password displayed within block 407. If all is correct, the cursor will then stop within block 408 so that the postal employee may enter a desired amount of postage in U.S. dollars as requested by the user owning TMU button 182 currently coupled to the POSTAGEMAKER program. In a preferred embodiment of the present invention, four bytes represent the amount of postage entered by the postal worker, ten bytes represent user-specific information, five bytes represent the user's ZIP code, three bytes represent the original postage amount, three bytes represent the number of strikes (or times that the postal storage device has been accessed), four bytes represent the accumulated value of postage taken from the postage storage device, and three bytes represent the expiration date of button 182. Button 182 may be programmed to expire at any time desired by the Post Office. The Post Office may desire that postage storage devices 18 expire every six months in order to maintain a valid registration with updated information.

None of the numbers described above, or the passwords generated therefrom, are displayed on the screen. However, POSTAGEMAKER utilizes information from button 182 to generate numerals in blocks 406 and 408 to generate the usage analysis log illustrated in block 402 and to perform a counters check illustrated in block 401. The counters check adds the number of strikes subtracted from 2,500,000 (see block 406; descending strike counter) to the number of strikes made (see block 408; ascending strike counter). If these numbers are accurate, their sum should equal 2,500,000. A similar dollar counter check is also performed. The TMU button 182 is initialized to recognize 2,500,000 strikes and $2,500,000 worth of postage. Whenever a user has used 2,500,000 strikes or used $2,500,000 worth of postage, the postage storage device must be returned to the Post Office, or exchanged for a new one.

As shown in block 408, the user has desired to add $500.00 worth of postage to TMU button 182. This amount has been entered by the employee. Subsequent to entering the $500.00 amount, the postal employee will press button 409 to initialize the system. Once the appropriate amount of postage has been selected, the postal employee may press button 410 to "write" the $500.00 amount into TMU button 182 coupled to system 10.

Alternatively, a user may maintain an account with the Post Office, or other authorized entity, or a credit card account which will be automatically charged for postal charges printed using TMU button 182. In this situation, the Post Office may require a retainer based on anticipated charges and then the Post Office will not enter a set monetary value into TMU button 182, but rather an authorization to debit a particular account and/or a time limitation will be entered into TMU button 182. For example for a TMU button 182 that is to be used for commercial purposes, such as in the present invention, the Post Office may set a month limitation on the button. When the user returns the button to the Post Office at the end of the month, the Post Office will access the memory of the TMU button 182 to determine how much postage has been charged for that month and will bill the user for those charges. Furthermore, if the user has a number of postal storage devices 18 the Post Office can access its records to determine if the user is behind in payments to any of his accounts by searching for accounts using the user's identification number. If the user has overdrawn his retainer or is late in the payment of his accounts, the Post Office can refuse to replenish TMU button 182.

Figure 4B:
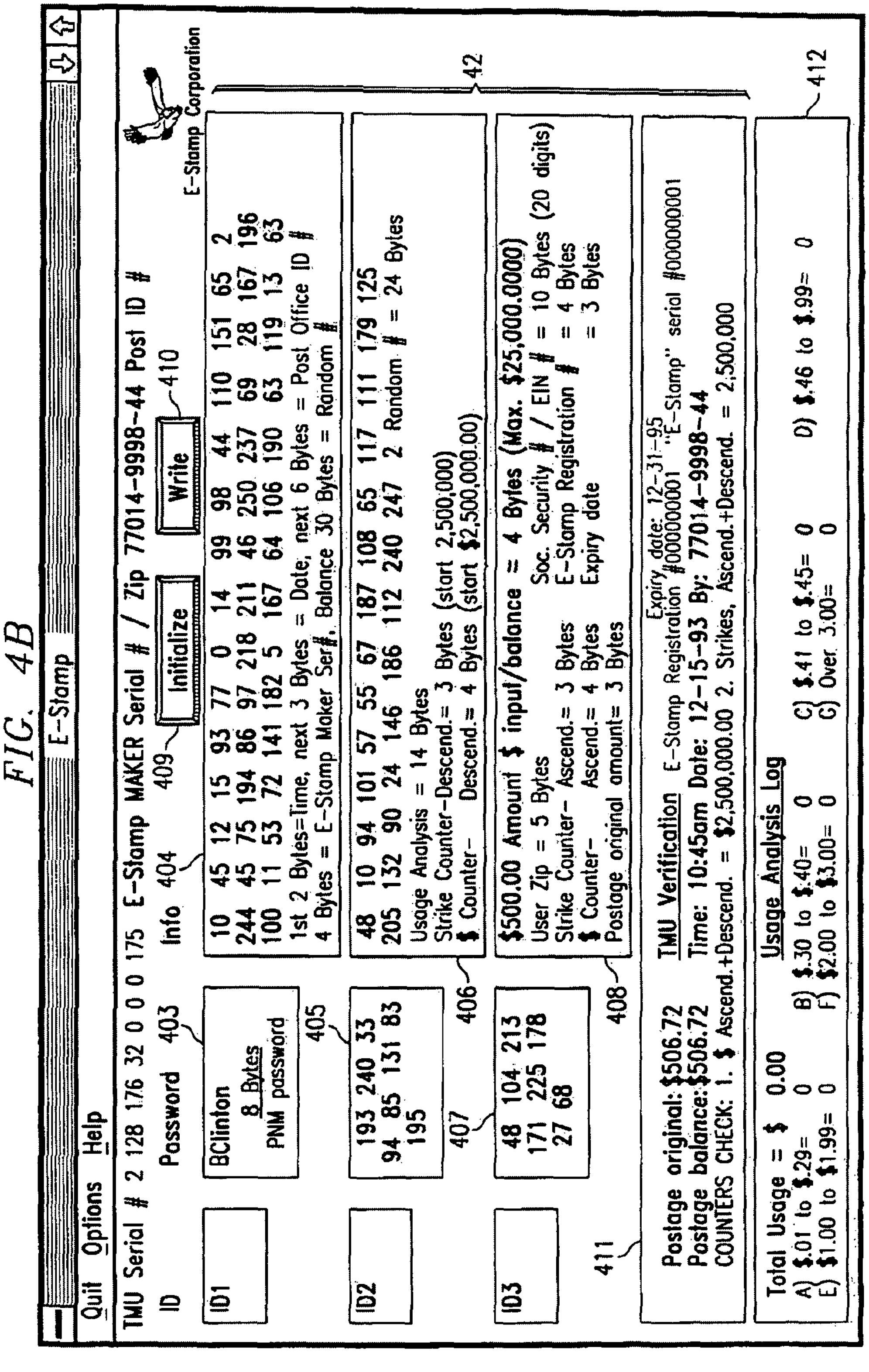

After the postal employee has pressed button 410 to "write" an amount of postage into TMU button 182, display screen 42, illustrated in FIG. 4B, appears on the screen. Display screen 42 is similar to display screen 40 except for the new information within block 411 which now shows that TMU button 182 contains $506.72 worth of postage, which was updated at 10:45 a.m. on Dec. 15, 1993 by the POSTAGEMAKER program located at Post Office location "77014-9998-44." Note that in this embodiment the postage original (block 411) and usage analysis log (block 412) are re-zeroed whenever new postage is added to TMU button 182.

Figure 5:
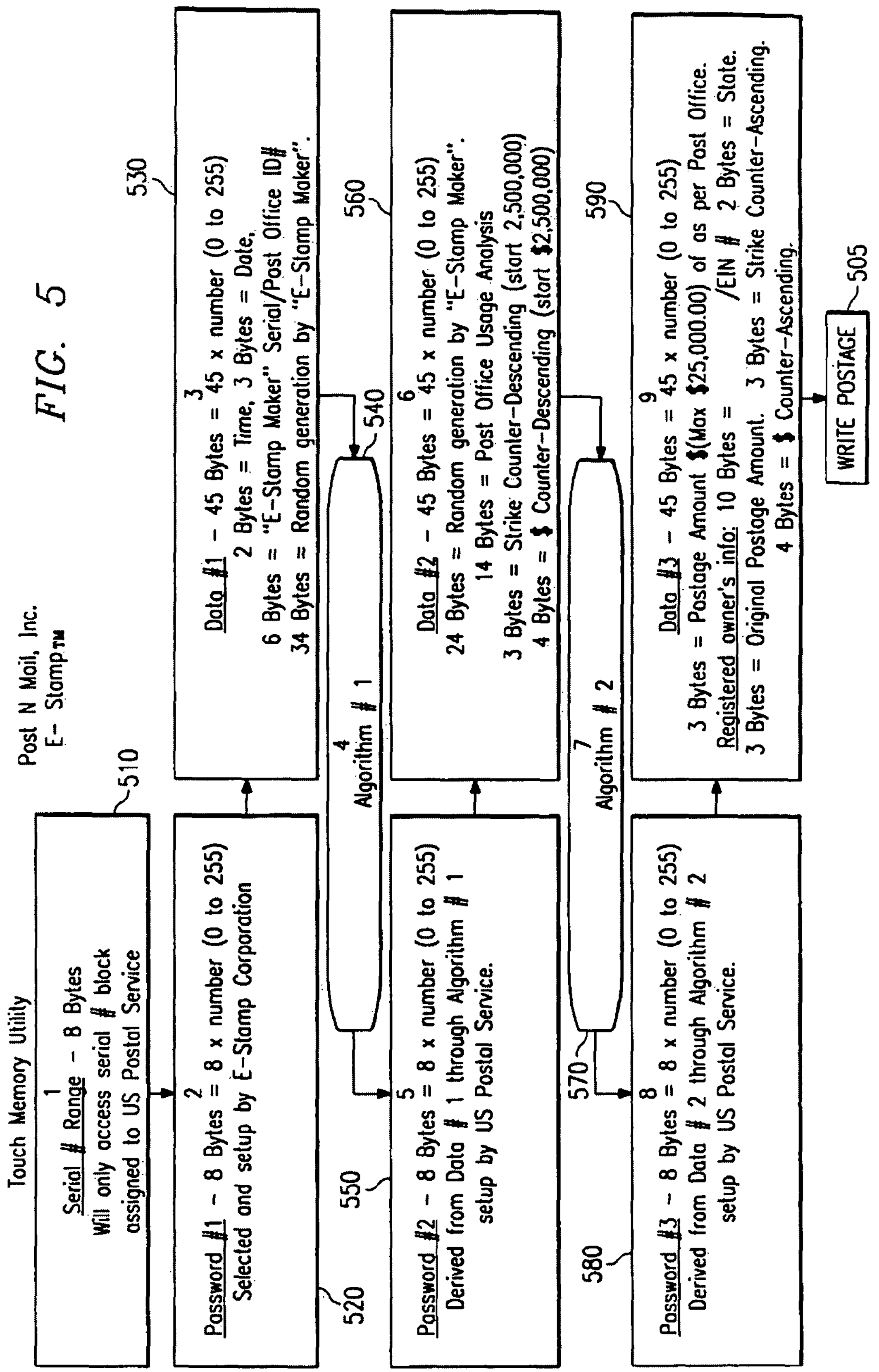
FIG. 5 illustrates a flow diagram of the replenishing process.

Referring next to FIG. 5, there is illustrated a flow diagram of the aforementioned method of providing security within the present invention. First, in block 510, the TMU serial number is accessed by the security program within the present invention. If the TMU serial number is not one specifically assigned to the U.S. Postal Service, the process will not proceed to step 520. In step 520, the program will write a password provided by the creator of the program. Thereafter, at step 530, the aforementioned data is produced and displayed within block 404. The random numerals will be produced as a function of the entered password.

Thereafter, in step 540, a first algorithm selected by the U.S. Postal Service will operate on the data within block 404 to produce a second password (step 550). This second password, displayed within block 405, is used within step 560 to generate a second set of data (the numerals displayed within block 406). A second algorithm within step 570, utilizes the second set of data to produce a third password (step 580). Once the above is written on the TMU button 182, the Post Office employee will be able to store postage to TMU button 182 by adding the desired amount within block 408 (step 590). Thereafter at step 505, write button 410 is "depressed" to thereby store postage within TMU button 182.

Referring next to FIG. 6, there is illustrated the algorithm used within the present invention, and described with respect to FIG. 5. Note that the TMU serial number may be incorporated into the algorithm(s) to make each TMU button unique. For a given 8-byte password, "pi" represents the first byte of that password. For a given 45-byte data area, "dl" represents the first byte of that data. The "mod operator" stands for the modulus, or remainder, of a division.

Once the required amount of postage has been transferred to the TMU button 182, the user may then physically carry the button to the desired location of use and couple TMU button 182 to a processor-based system 10 through button holder 172.

Once the user has registered his E-STAMP program with E-Stamp Corporation and his postal storage device 18 with the Post Office, he may then load the E-STAMP program into a processor-based system 10, if he has not already done so. In a preferred embodiment of the present invention, the E-STAMP program is loaded into a processor-based system controlled by a set of instructions from a document generating program, preferably an application program programmed to interact with a customer to generate a personalized greeting card, or other piece of mail.

An interface program is used to integrate the E-STAMP program with the personalized card generating program. The two application programs will be coordinated. For example, graphic configurations of postage indicia that correspond to the type of cards and messages generated by the card generating program will be created and imported into the E-STAMP program. Likewise, information regarding the types of documents being generated may be intercommunicated so as to allow the generation of a desired number of postage indicia and their proper placement on the document (s). In addition, routines may be added to the E-STAMP program that will automatically convert information entered as the addressee's address into a ZIP+4 bar code and/or automatically encode some of the entered data regarding the postal storage device, the designation of the letter, etc. into a graphical security interface to be printed on a label or an envelope. Furthermore, the E-STAMP program will be programmed to format all of the entered information to be printed in the desired format.

In a preferred embodiment of the present invention, the user may want to removably couple two or more postal storage devices 18 to the processor-based system controlled by the set of instructions from the document generating and E-STAMP application programs, hereinafter referred to as the document generating system. Then if one of the postal storage devices becomes depleted of postage or is not replaced before its time limitation runs out, then the backup device may be used so that the system will continue to operate.

Yet before the E-STAMP program can operate with the document generating system, an authorized postal storage device must be coupled to the system and validated by the E-STAMP program. A preferred embodiment uses TMU button 182 coupled to the processor based system through a button holder 172.

Figure 7A:
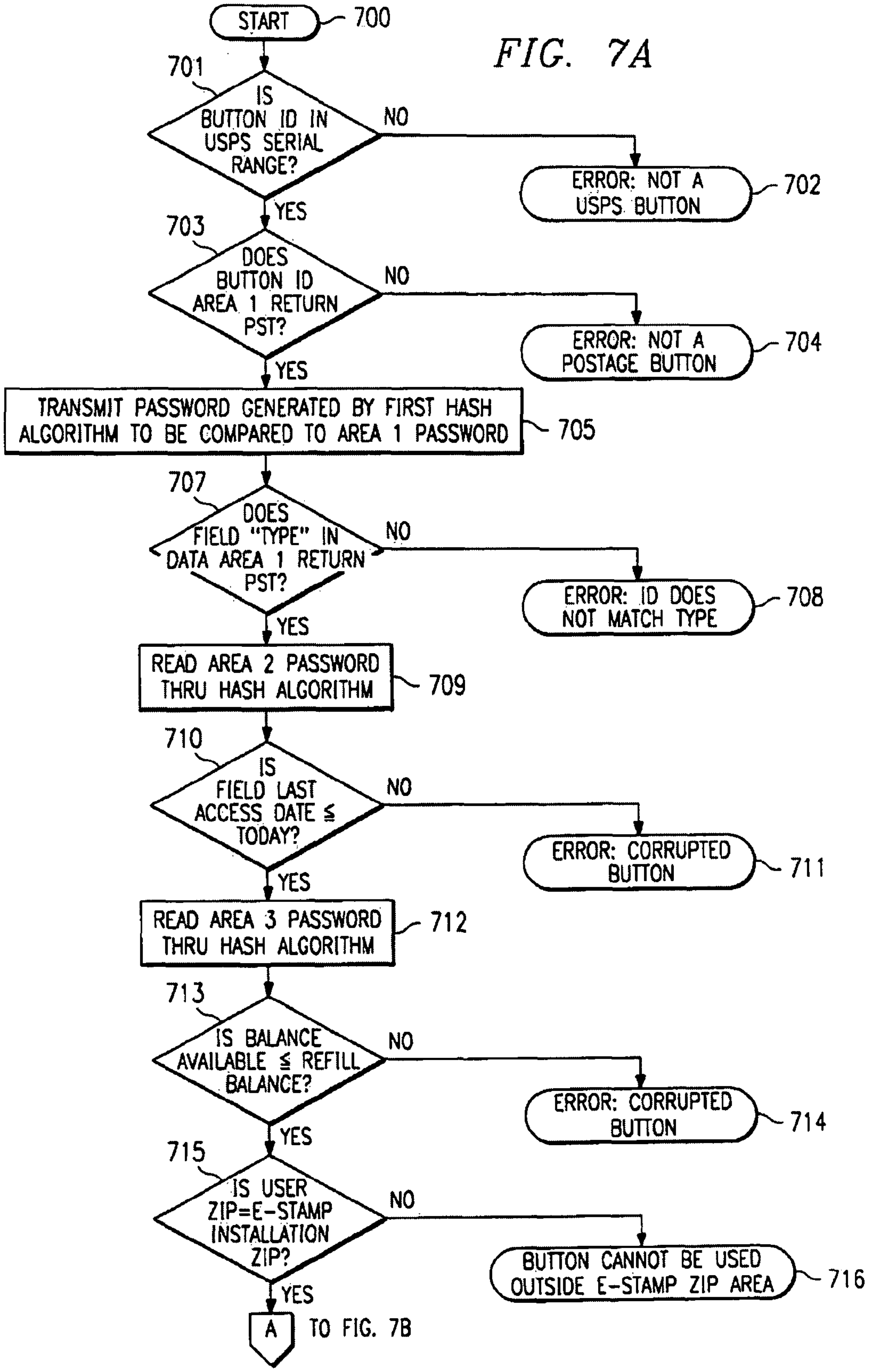
FIGS. 7A and 7B illustrate a flow diagram for controlling the removal of data from the memory of a postal storage device.
Figure 7B:
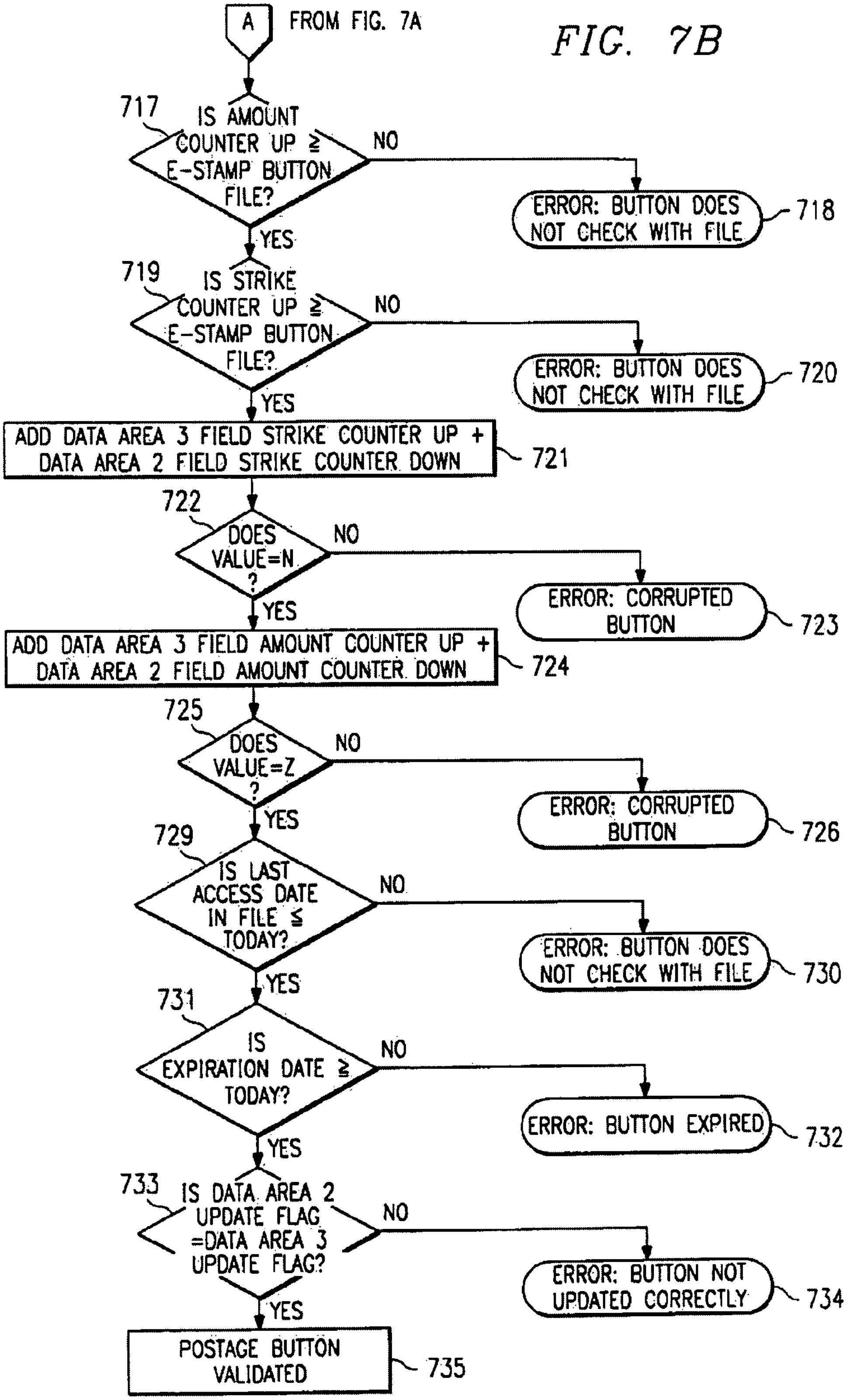
Figure 8:
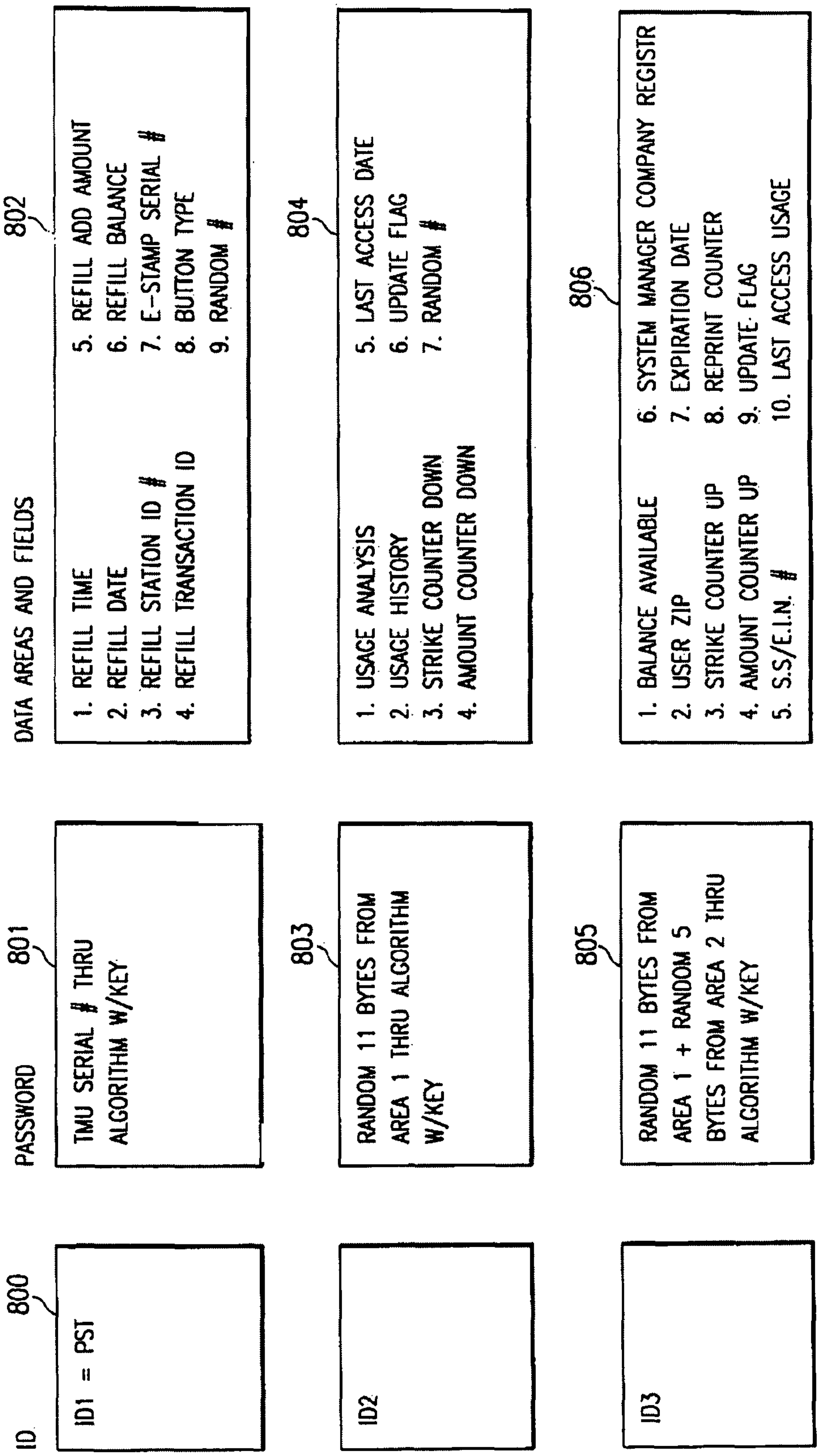
FIG. 8 illustrates how a postage button is encoded.

Referring next to FIGS. 7A and 7B, the user validation procedure for a postage button coupled to the document generating system begins at Step 700 with the initiation of the user's software program. At Step 701, the software reads the unique serial number of the button and verifies that that serial number falls within a range assigned by the button manufacturer to the Post Office; if it does not, an error occurs and processing halts at Step 702, otherwise processing continues to step 703.

TMU button 182 includes several memory sections, each section includes an ID area, a password area and a data area. Access to a given data area is controlled by a password written into the corresponding password area.

When the user's software queries a postage button (portable memory) at step 703, a code indicating that the postage button 182 is a button for the retrieval of postage by a customer (PST) should be returned from the postage button's first password area 800 (FIG. 8), otherwise an error occurs at step 704. If, at step 703, a code indicating that the postage button 182 is a button for the retrieval of postage by a customer, at step 705 the user's software transmits to the button a password generated by applying a first hash algorithm to the numerical sequence of the TMU serial number for the given button 182. If the password generated by the user's software matches that stored in first password area 801, access to first data area 802 (FIG. 8) is allowed and processing continues at step 707; otherwise a string of invalid data is received from the button as described above.

At step 707, the user's software reads the button type field in first data area 802. If the button returns the postage button code previously known by the software loaded on the document generating system, then processing continues; otherwise, an error occurs at step 708 and processing halts. Assuming the correct button code is read at step 707, at step 709 the user's software reads the second password area 803 using a second hash algorithm, an example of which is shown in FIGS. 4A and 4B. Specifically, the user's software takes the string of random data acquired by gaining access to a first data area 802 and applies the second hash algorithm thereto. The resulting password is then transmitted to the button, and. if a match occurs with the password in second password area 803, access is gained to second data area 804; otherwise a string of invalid data is received from the button. If access to second data area 804 is gained at step 709, then at step 710 the user's software reads the last access date field of second data area 804. If the last access date written into this field is before the current date processing continues, otherwise an error occurs at step 711.

Next, at step 712 the user's software attempts to gain access to third data area 806 (FIG. 8) of the postage button coupled to the document generating system. In this instance, the user's software then takes 11 bytes of random data from first data area 802 and 5 bytes of random data from second data area 804 and applies the third hash algorithm thereto. The resulting password is transmitted to the button and if a match occurs with the password held in third password area 805, access is gained to third data area 806; otherwise a string of invalid data is received from the button.

Assuming access to third data area 806 (FIG. 8) is gained at step 712, at step 713 the user's software reads the balance available field of third data area 806 and the refill balance field of first data area 804. If the balance available is less than or equal to the refill balance then processing continues, otherwise a corrupted button is detected at step 714.

For an uncorrupted button, the user ZIP code written into the user ZIP code field of third data area 806 is read and compared at step 715 with the user ZIP code assigned to the user's software stored in the document generating system. If they match, processing continues; otherwise, an error occurs at step 716 since a postage button cannot be used outside the ZIP code assigned to the corresponding customer software. This feature is (like all security levels in the system) optional, and can be modified to include several ZIP codes, if desired.

At step 717, the customer software reads the value in the amount up-counter of third data area 806 and compares it with a corresponding amount value totaled and stored by the user's software. The amount up- and down-counters in each button are never cleared during the life of the button. Thus, if the amount in the button amount up-counter is greater than or equal to the amount in the user's software file, the button passes at step 717; otherwise, an error occurs at step 718. A similar test is performed at step 719 where the user's software reads the value in the strike up-counter and compares it with a corresponding strike tally kept by the user's software. Again, since the strike counters are never cleared, the value in the strike counter must be greater than or equal to the total in the software file, otherwise at step 720 an error occurs.

If, at step 719, the value in the strike counter is greater than or equal to the total in the software file, at step 721, the value in the strike up-counter of third data area 806 is added to the value in the strike down-counter of second data area 804. Since the strike down-counter always decrements from a predetermined initial value by one with the printing of each indicia and the strike up-counter always increments by one from an initial value simultaneously, their total must always equal the same value N. Thus, if at step 722 the sum of the values in the strike up- and down-counters equals predetermined value N, processing continues; otherwise, the button is determined to be corrupted at step 723.

Next, at step 724 the value in the amount down-counter of second data area 804 and the value in the amount up-counter in third data area 806 are summed. Since the value in the amount up-counter increments by the amount of the postage used with the printing of each indicia from an initial value and the amount down-counter simultaneously decrements from an initial value by the same amount, the sum of their values must always equal the value Z. Thus, at step 725, if the total of the amount counter data read from the button equals value Z, then processing continues; otherwise, an error occurs at step 726 and processing is halted.

At step 729, the customer software reads the last access date written into the corresponding field in second data area 804. If the recorded last access date is the same as or before the present date the button passes, otherwise an error occurs at step 730. This prevents the entering of random data into the portable memory.

At step 731, the expiration date written into the expiration date field of third data area 806 is read to determine if the button has expired. If the current date is before the expiration date, the button is still valid; otherwise, at step 732 the button is determined to be expired.

At step 733 a check is made of the update flags, or the refilling operations that the postage button 182 has undergone. The update flag in second data area 804 must be equal to the update flag in third data area 806; otherwise, an error has occurred during the update sequence and processing stops at 734.

If the postage button 182 coupled to the user's system 10, or the document generating system, passes the last test at step 733, the button is validated at step 735 and the customer can now print postage indicia up to the refill balance available or until the termination date of the postage button 182.

A preferred method for conducting the above described transactions with the button is described in co-pending commonly assigned U.S. application entitled "SYSTEM AND METHOD FOR PROVIDING FAULT TOLERANT TRANSACTIONS OVER AN UNSECURED COMMUNICATION CHANNEL," previously incorporated herein by reference.

Figure 9:
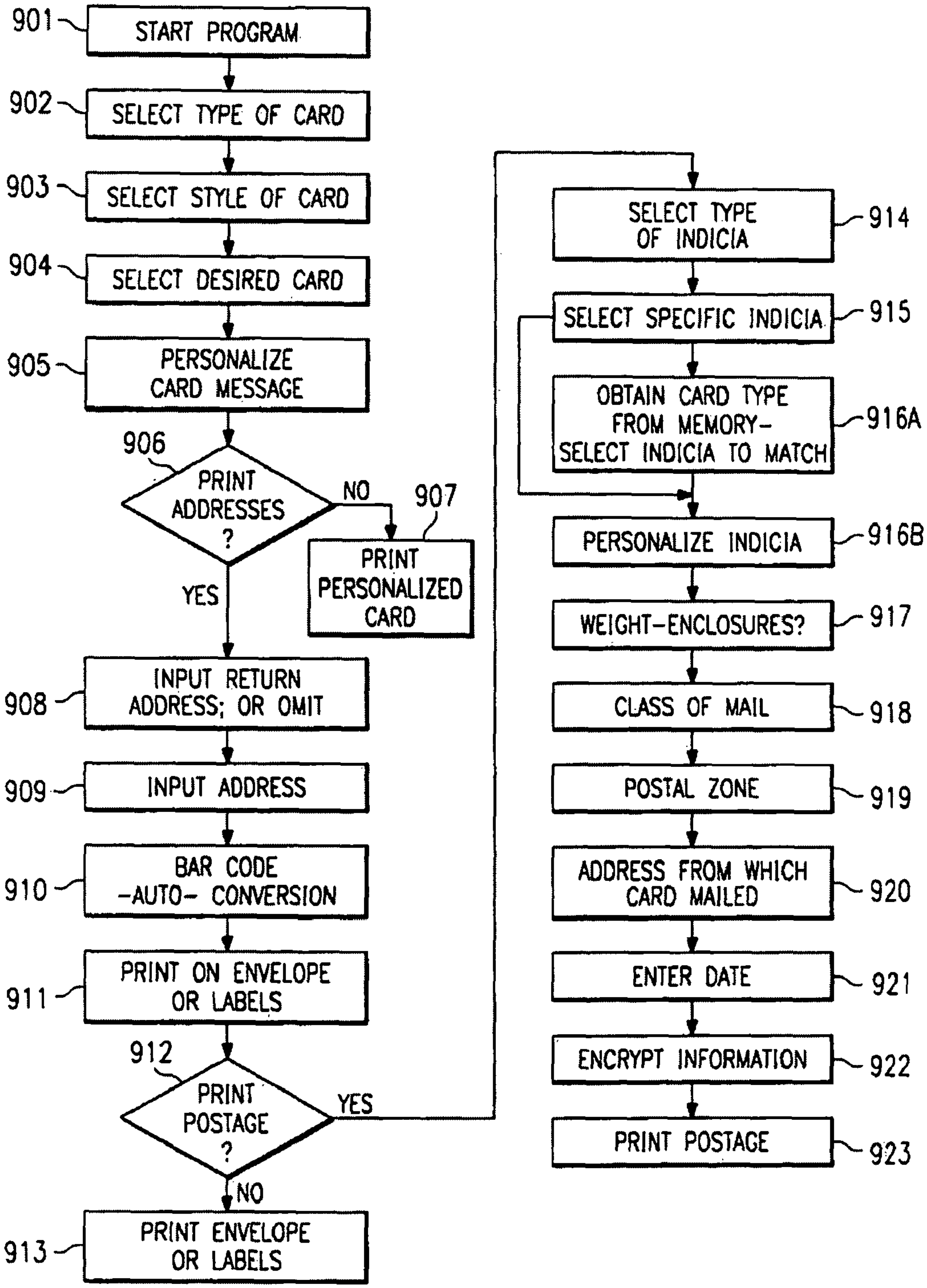
FIG. 9 illustrates a flow diagram of the operation of the present invention within a card generating system.

Referring next to FIG. 9, there is illustrated a flow diagram of the process employed by the document generating system, utilized for generating a greeting card, that has an E-STAMP program incorporated therein.

Figure 10:
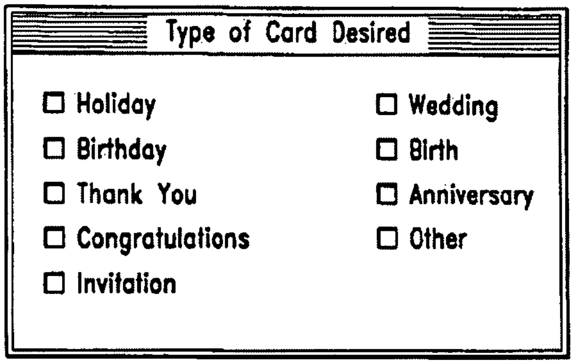
FIG. 10 illustrates one embodiment of a display interface provided to a customer for selecting a type of greeting card.

At step 901, the document generating system is activated by a customer. In a preferred embodiment, the document generating and E-STAMP programs will provide for input from a user via a user interface such as through keyboard 15, or mouse 16. At step 902, a screen appears to the customer listing the types of cards that the document generating system is programmed to produce such as invitation, birthday, anniversary, holiday, wedding, etc. An example of such a screen is seen in FIG. 10. However, this screen, as with all the screens described below, may appear in a wide variety of formats with numerous different options available.

Figure 11:
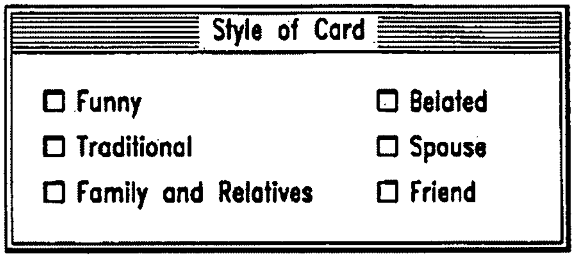
FIG. 11 illustrates one embodiment of a display interface provided to a customer for selecting a style of greeting card.

Next, at step 903, the customer will be provided with a menu of styles for the type of card that he has selected. A sample screen providing optional styles for a birthday card is illustrated in FIG. 11. The customer may choose a funny card, a traditional card, a belated card, or a card for a relative. Once the customer selects the style of card that he wants, the document generating system will provide one or more sample cards of that style for the customer to choose from (step 904). Of course, where certain types of cards are selected, the customer may be given additional options such as that of generating an associated item, e.g., an R.S.V.P. card.

Figure 12A:
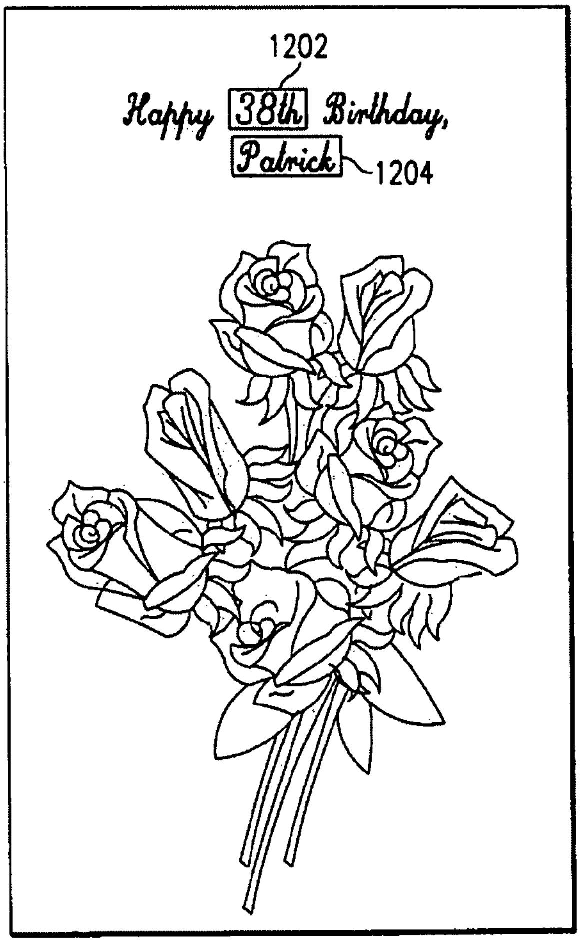
FIGS. 12A and 12B illustrate one embodiment of a personalized greeting card.
Figure 12B:
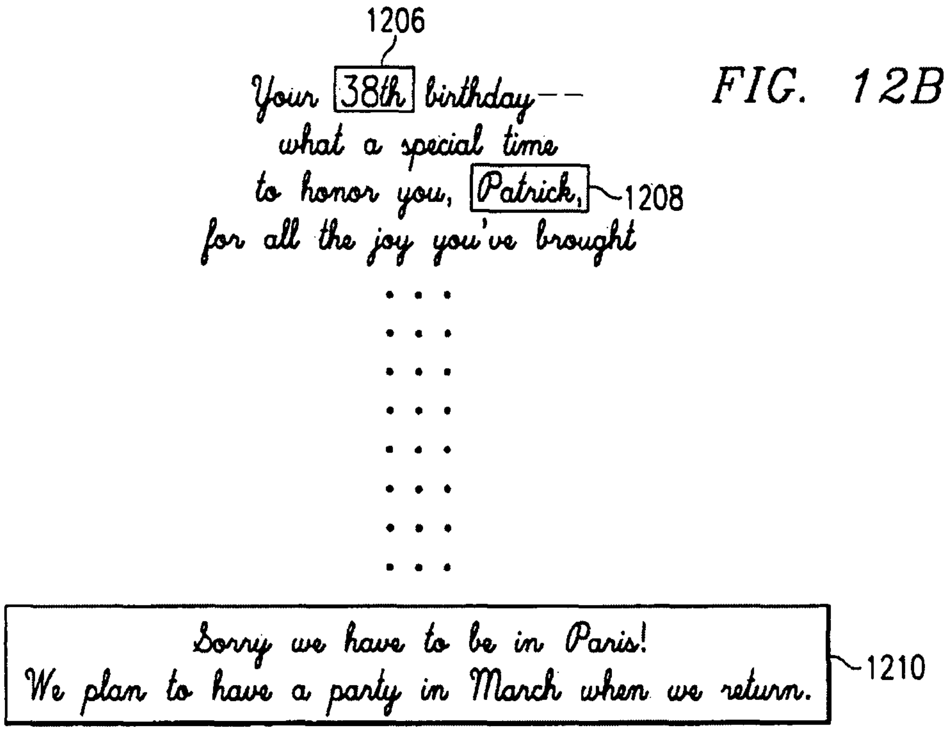

When the customer has decided on a specific card, the customer can then create his/her own message to correspond to the card selected, or he/she can personalize the message that is provided (step 905). For example, FIGS. 12A and 12B show an example of a personalized birthday card. In the example shown in FIGS. 12A and 12B, the document generating system allowed the customer to enter the name of the person to receive the card in box 1204 and box 1208, birthday the recipient was celebrating in box 1202 and box 1206, and personal message in box 1210.

In step 906, once the card has been finalized a prompt will appear asking the customer if he/she wishes to continue to print an addressed envelope. If the answer is "no," the document generating system will go to step 907 and produce a freshly printed greeting card, and any associated item, containing the customer's personalized message and terminate the program. However, if the customer indicates that he/she wishes to continue the program, then a display 80 similar to that illustrated in FIG. 13 will appear on the screen.

Next, at step 908, the customer is prompted to manually input his/her return address in box 1303. If a return address is not desired, it may be omitted. Thereafter, in step 909, the contents of address box 1305 are entered in a manner similar to the contents of return address 1303.

Where an associated document is also being generated, the address and return addresses may be transposed. Of course, steps 908 and 909 could include prompting the customer to input different addresses for the associated document, if desired.

Next, at step 910, the document generating system will automatically generate the appropriate PostNet bar code from the addressee's ZIP code. The printed address will have the PostNet Zip+4 bar code, as described in Postage Service Publication 67, printed either above or below the addressee's address. The Post Office encourages the use of PostNet bar codes, as it allows mail to be automatically sorted for distribution. In fact, the Post Office charges less postage for mail that has the appropriate PostNet bar code imprinted thereon.

The customer may then select the format that the addresses will be printed in by the use of box 1304. The return address and addressee's address may be printed on labels or on an envelope through printer 19.

Thereafter, in step 912 the customer has the option to continue the program and have the appropriate postage for the card, and any associated document such as a return R.S.V.P. card, calculated and printed. If the customer declines to continue, then the card greeting system will terminate its interaction with the customer at step 913 and print the addresses on labels or an envelope, whichever was selected by the customer at step 911.

Figure 14:
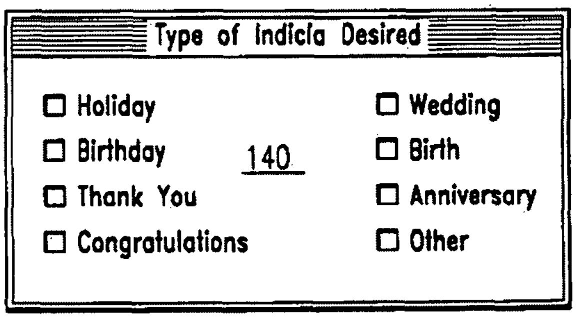
FIG. 14 illustrates one embodiment of a display interface provided to a customer for selecting a type of postage indicia.
Figure 13:
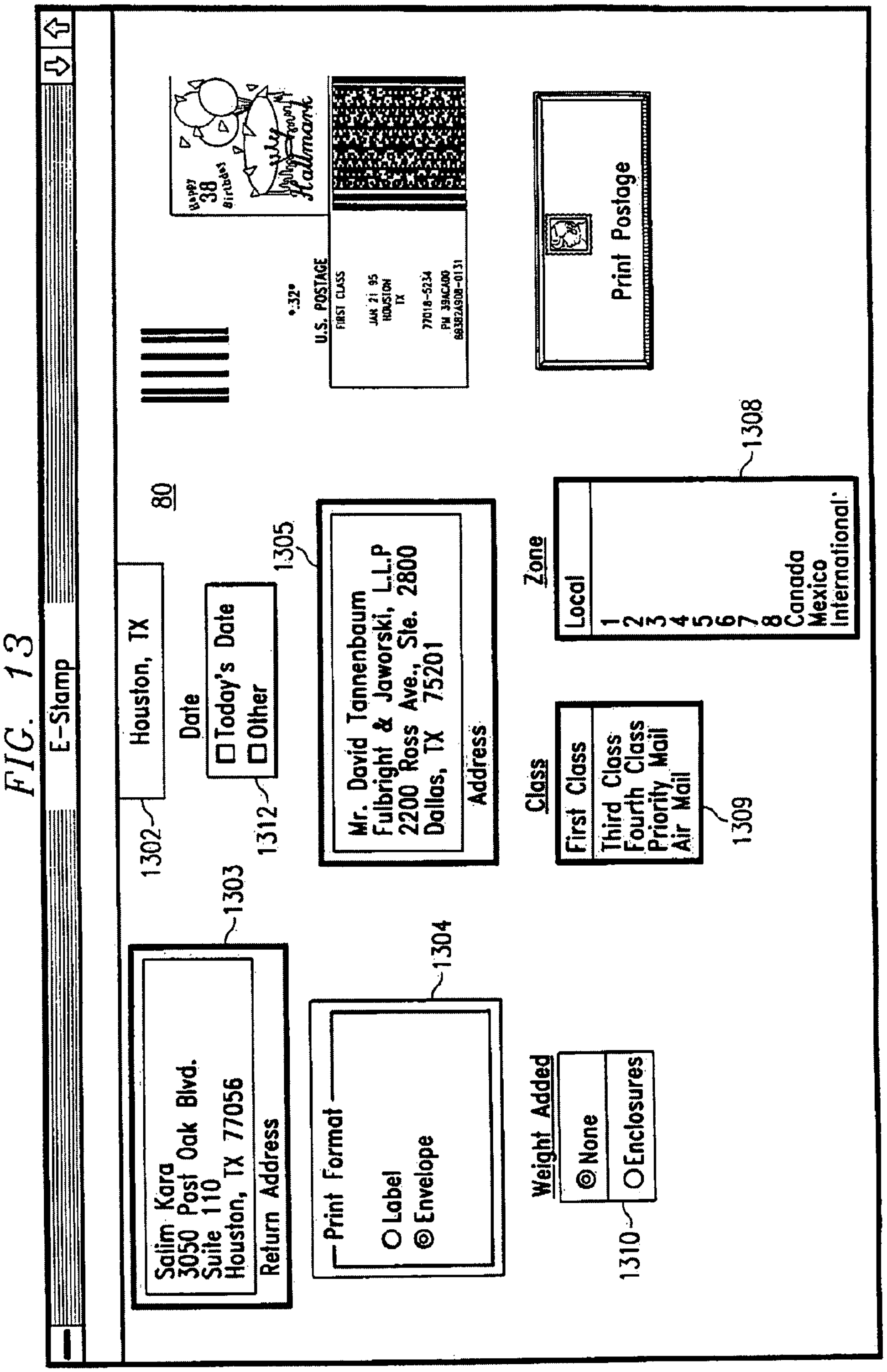
FIG. 13 illustrates a display interface provided to a customer when accessing the present invention on a card generating system.
Figure 15A:
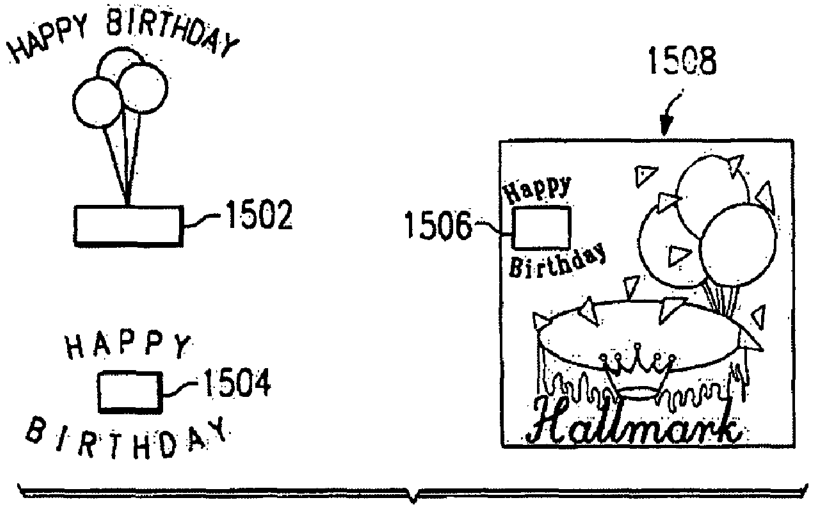
FIG. 15A illustrates one embodiment of a display interface provided to a customer for selecting a specific postage indicia that can be personalized by the customer.

If, at step 912, the customer decides to continue to calculate and print the postage, a new screen 140 may appear, such as seen in FIG. 14, giving the customer a selection menu for the type of indicia that the customer desires to create (step 914). The customer may select a different indicia for any associated document or may select a single indicia to be applied to both items. Once the customer selects a type of indicia, a new screen such as seen in FIG. 15A will appear with at least one sample indicia for the customer's selection (step 915). Alternatively, the E-STAMP program may automatically select sample indicia such as that seen in FIG. 15A that corresponds to the type of card the customer has generated based upon information contained in the CPU memory (Step 916A). The indicia may be stored in a data base within the CPU or could be downloaded via modem on a time-by-time basis.

Figure 15B:
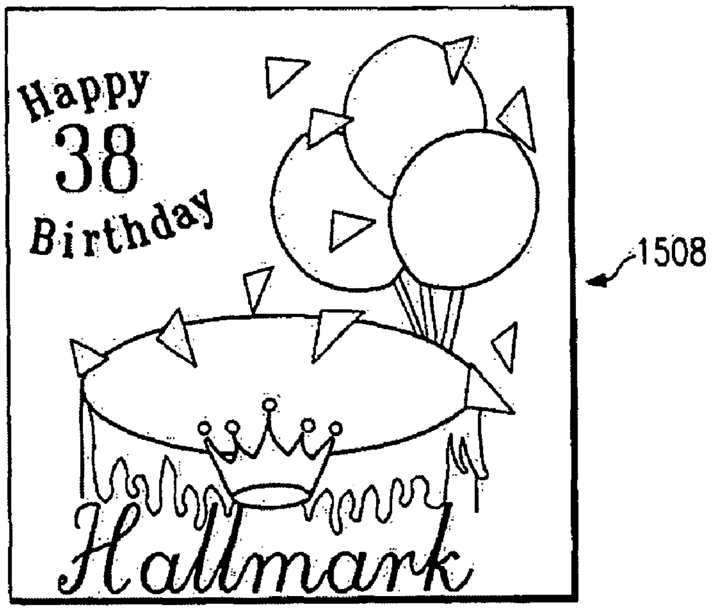
FIG. 15B illustrates a postage indicia that has been personalized.

Once the customer has selected the desired indicia he/she may personalize the indicia (Step 916B) with information such as the name of the person whose birthday it is (boxes 1502 and 1504) and which birthday that person is celebrating (boxes 1504 and 1506). For example, if the customer selected stamp indicia 1508, the document generating system would prompt the user to add a number representing which birthday the recipient was celebrating in box 1506. FIG. 15B illustrates how stamp indicia 1508 would appear after it has been personalized. Of course, for business letters there would be a data base (not shown) containing indicia pictures and wording appropriate for various situations, including slogans relating to the company using the system.

Thereafter, in step 917, the customer will indicate whether the card will be mailed by itself, or with enclosures by selecting the appropriate option in box 1310. If no enclosures are included, then the system will calculate the appropriate postage based on the weight of the card, i.e. less than one ounce. If enclosures are to be sent with the greeting card, the customer must enter the weight of the enclosures. This weight may be entered manually, or automatically through the use of scale 103 coupled to processor-based system 10, the document generating system, in a manner well known in the art. The weight of the card enclosures will be used to calculate the appropriate postage for the card. Of course, where the document generating system is itself generating the enclosure, such as the aforementioned return R.S.V.P. card, the weight of the enclosure may be automatically determined by the system.

In step 918, the customer selects the class of mail from the choices shown in box 1309.

Next, at step 919, the customer may select a U.S. postal zone or alternatively elect that the card is to be sent to Canada, Mexico or some other international designation as depicted in box 1308. Of course, where postage is being generated for an associated document, the postal zone may automatically be selected for this document assuming that the return card will be posted at the original card's destination, presumably directed to the place of posting the original card. However, step 919 may also allow the user to select a different postal zone for the return document, if desired. Customer selection of the international designation in box 1308 will result in a drop down menu to allow the user to enter the country of designation and allow the E-STAMP program to automatically calculate the necessary postage.

The E-STAMP program will automatically incorporate the aforementioned entered parameters—weight, class, zone—in order to correctly calculate the correct postage to print in conjunction with the meter stamp(s).

In step 920, the customer is provided with box 1302 to insert the location from which the mail is to be sent. If no location is entered, the location of the document generating system will be entered into box 1302. The location entered into box 1302 may be utilized by the E-STAMP program to calculate the correct postage.

At step 921, the customer may choose to have the date that the mail is stamped automatically entered by the E-STAMP program, or the customer may choose to enter the date that the customer desires to show on the card. The customer's choice is registered in box 1312. Of course, where postage is generated for an associated document, additional information, as described above, may be included on or within the generated indicia as the date of posting will generally not be known for this associated (return) document.

At step 922, the E-STAMP program may optionally be programmed to incorporate preselected information, such as that entered into the E-STAMP program, into an encrypted message that is machine readable. Any number of graphical security interfaces, such as Symbol's Portable Data File Code (the PDF417 symbology) as described above, may be used to encrypt the information. An encrypted message may include any combination of the following information: the day, the date, the postage storage device serial number, the E-STAMP serial number, the sender's ZIP code, the addressee's ZIP code, the expiration date of the postage storage device, a date by which the item must be posted, a location from which the item must be posted, the cumulative values of the strike and dollar counters, E-Stamp Corporation registration number, the user's identification number, and the Post Office identification number.

This encrypted information may be printed separately from the postage indicia or the selected information may be incorporated within the meter stamp using a graphical security interface. A preferred embodiment, illustrated in FIGS. 16A and 16B, will print the postage indicia separately from the encrypted message and other information (printed in a visually recognized form) such as the amount of postage imprinted on the card, the date, etc. By applying the encrypted information onto the envelope, the Post Office can scan the encrypted information to verify that an item of mail has been posted with authorized postage and to track the use of postage storage devices 18.

Figure 16A:
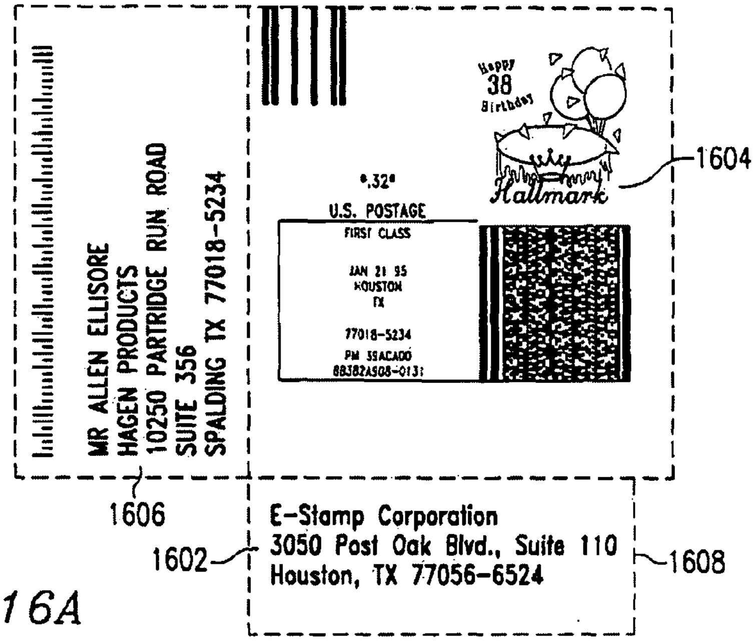
FIGS. 16A and 16B illustrate two embodiments of print formats of the information entered into the "E-STAMP" program.
Figure 16B:
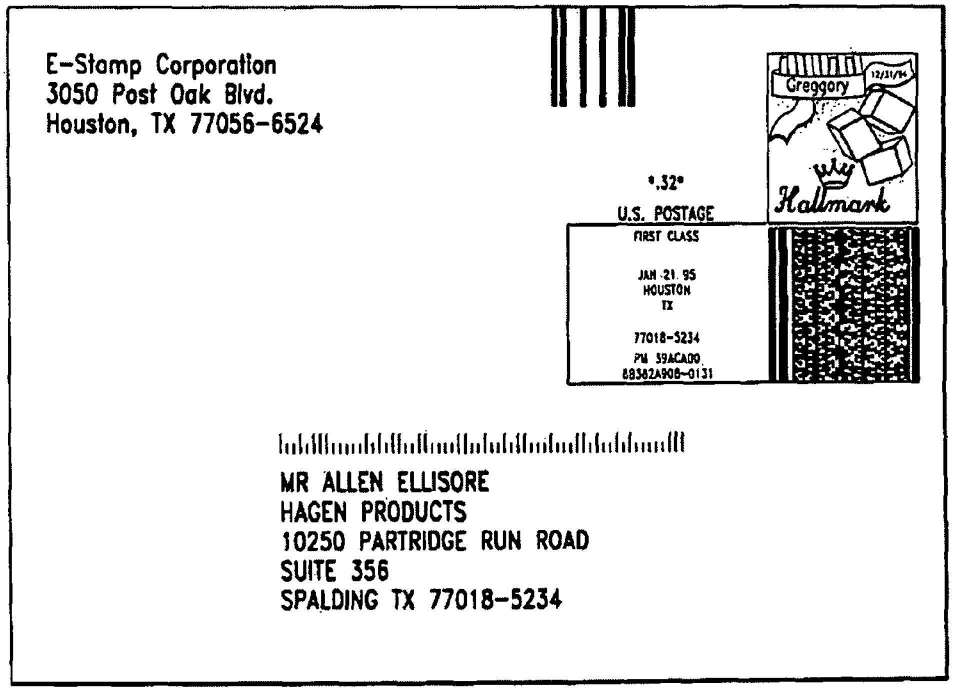

In step 923, the E-STAMP program utilizes the input/output ports of the document generating system to send to printer/label maker 19, the correct data pertaining to the meter stamp, the postage indicia, the encrypted message, the authorized amount of postage, the return address, the addressee's address, etc. to be printed on an envelope, as illustrated in FIG. 16B, or on detachable labels attached to the back of the greeting card as illustrated in FIG. 16A. The detached labels can be removed and attached to the front of an envelope. Three labels (i.e., return address 1602, addressee's address 1606 and postage indicia 1604), would be printed on a clear film that had been "kiss cut" 1608 to allow each label to be peeled from the uncut backing. Of course, where return postage is desired, additional postage may be printed to be removed and attached to a return item of mail. Likewise, a set of detachable labels, such as for return address, addresses's address, and postage indicia, may be printed for the return document in the alternative to, or in place of, those described above for the outbound document.

The amount of postage printed on the meter stamp(s) is automatically debited from the user's account or deducted from the amount stored within TMU button 182. Information stored in TMU button 182 memory is also automatically updated including the usage record for this particular serial number of TMU button 182 and any other information that requires updating.

The aforementioned steps may be repeated for subsequent transactions of the document generating system until the TMU button 182 reaches the time limitation embedded in its memory, or has reached the end of its stored amount of postage. If two TMU buttons are coupled to the document generating system, then if one button becomes inoperable, the other button can be automatically accessed by the document generating system. Typically, the user will check on and/or replace the TMU buttons 182 coupled to the document generating system on a monthly, or other time related, basis.

The aforementioned word processing, accounting, E-STAMP and POSTAGEMAKER programs have been shown and described with respect to a "WINDOWS" operating environment on a general purpose processor-based system 10. Of course, other means could be employed for implementing the present invention within a processor-based system.

Although the present invention and its advantages have been described in detail, it should be understood that various changes, substitutions and alterations can be made herein without departing from the spirit and scope of the invention as defined by the appended claims.

What is claimed is:

1. A multi-part label comprising:

a postage indicia label portion; and an address label portion, wherein the postage indicia label portion, and the address label portion are removably disposed upon a same carrier substrate for automated manipulation by a printer mechanism to print a postage indicia upon the postage indicia label portion, and to print an address upon the address label portion during a same printing operation, and wherein the postage indicia label portion and the address label portion are cut to provide separate portions of the multi-part label, wherein said postage indicia label portion and said address label portion are adjacent each other, and wherein said postage indicia label portion and said address label portion are disposed on a common face of said carrier substrate.

2. The multi-part label of claim 1, wherein the address printed upon the address label portion comprises an address of an addressee, wherein the addressee is an addressee of a postal item to be posted using the postage indicia.

3. The multi-part label of claim 1, wherein the postage label portion and the address label portion comprise clear film labels.

4. The multi-part label of claim 1, wherein the postage indicia label portion is sized and shaped to accommodate a postage indicia having a machine readable barcode.

5. The multi-part label of claim 4, wherein the postage indicia label portion is sized and shaped to further accommodate a human readable portion.

6. The multi-part label of claim 4, wherein the postage indicia label portion is sized and shaped to further accommodate a user selected graphic image.

7. The multi-part label of claim 1, further comprising:

a second address label portion, wherein the second address label portion is removably disposed upon the carrier substrate for automated manipulation by the printer mechanism.

8. The multi-part label of claim 7, wherein the second address label portion is cut to provide a separate portion of the multi-part label.

9. The multi-part label of claim 7, wherein the address printed upon the address label portion comprises an address of an addressee, wherein the addressee is an addressee of a postal item to be posted using the postage indicia, and wherein the address printed upon the second address label portion comprises an address of an addressor, wherein the addressor is an addressor of the postal item.

10. A method comprising:

obtaining address data, wherein said address comprises an addressee address and an addressor address, wherein said addressee address is associated with an addressee of a postal item to be posted, and wherein said addressor address is associated with an addressor of the postal item;

generating, by a postage generating computer processor, a first postage indicia data comprising addressee information from said addressee address and a second postage indicia data comprising addressor information from said addressor address; and printing said first postage indicia data as a first postage indicia upon a first indicia label portion of a multi-part label, said second postage indicia data as a second postage indicia upon a second indicia label portion, and at least a portion of said address data as an address upon an address label portion of said multi-part label, wherein said first postage indicia label portion, said second postage indicia label portion, and said address label portion are each disposed upon a single document and are each separate and removable, and wherein said address label portion is adjacent at least one of said first postage indicia label portion and said second postage indicia label portion on said single document.

11. The method of claim 10, wherein said printing said postage indicia data and said address data is performed under control of a personal computer based postage indicia system.

12. The method of claim 11, wherein a printer operating under control of said personal computer based postage indicia system comprises a general purpose printer.

13. The method of claim 11, wherein a printer operating under control of said personal computer based postage indicia system comprises a special purpose label-maker.

14. The method of claim 10, wherein said postage indicia label portion and said address label portion are each removably disposed upon a same carrier substrate.

15. The method of claim 14, wherein a cut is provided between said postage indicia label portion and said address label portion to thereby define separate removable label portions upon said carrier substrate.

16. The method of claim 10, wherein said printing said postage indicia data and said at least a portion of said address data comprises:

printing said addressee data as a first address upon said address label portion of said multi-part label; and printing said addressor data as a second address upon a second address label portion of said multi-part label, wherein said addressee data and said addressor data is printed in a single pass of a printer.

17. The method of claim 10 wherein said address label portion is disposed on a same face of said single document as at least one of said first postage indicia label portion and said second postage indicia label portion.

18. The method of claim 10 wherein said generating comprises:

generating said first postage indicia data and said second postage indicia data for related mail items.

19. The method of claim 10 wherein said generating comprises:

generating said first postage indicia data and said second postage indicia data for separate related deliveries by a postal authority of at least one mail item.

20. The method of claim 19 wherein said separate related mail deliveries comprise one of the following related mail deliveries:

delivery of a given mail piece from a sender to a recipient, and further delivery of said given mail piece from said recipient;

delivery of a given mail piece from a sender to a recipient, and further delivery of a related mail piece from said recipient; and delivery of a given mail piece from a sender to a recipient, wherein said given mail piece includes a related mail piece therewith, and further delivery of said included related mail piece from said recipient.

21. The method of claim 19 wherein said separate related mail deliveries comprise one of the following related mail deliveries:

delivery of a given mail piece from a sender to a recipient, and return delivery of said given mail piece to said sender;

delivery of a given mail piece from a sender to a recipient, and return delivery of a related mail piece to said sender; and delivery of a given mail piece from a sender to a recipient, wherein said given mail piece includes a related mail piece therewith, and return delivery of said included related mail piece to said sender.

22. A multi-part mail item comprising:

a document to be mailed;

a postage indicia label portion located on the document, wherein the postage indicia label portion is sized and shaped to accommodate a postage indicia having a machine readable barcode;

a first address label portion located on the document; and a second address label portion located on the document, wherein the postage indicia label portion, the first address label portion, and the second address label portion are removably disposed upon the document, for automated manipulation by a printer mechanism to print the document, to print a postage indicia corresponding to the document upon the postage indicia label portion, and to print addresses upon the first and second address label portions during a same printing operation, wherein the addresses correspond to the location the document will be mailed and the location the document will be mailed from.

23. The multi-part label of claim 22, wherein the postage indicia label portion is sized and shaped to further accommodate a human readable portion.

24. The multi-part label of claim 22, wherein the postage indicia label portion is sized and shaped to further accommodate a user selected graphic image.

25. The multi-part label of claim 22, wherein the postage indicia label portion and the first and second address label portions are cut to provide separate portions of the multi-part label.

26. The multi-part label of claim 22, wherein the address printed upon the first address label portion comprises an address of an addressee, wherein the addressee is an addressee of a postal item to be posted using the postage indicia, and wherein the address printed upon the second address label portion comprises an address of an addressor, wherein the addressor is an addressor of the postal item.

* * * * *